(12) United States Patent
O'Connor et al.

(10) Patent No.: US 6,950,923 B2
(45) Date of Patent: *Sep. 27, 2005

(54) METHOD FRAME STORAGE USING MULTIPLE MEMORY CIRCUITS

(75) Inventors: James Michael O'Connor, Mountain View, CA (US); Marc Tremblay, Palo Alto, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 233 days.

This patent is subject to a terminal disclaimer.

(21) Appl. No.: 10/346,886

(22) Filed: Jan. 17, 2003

(65) Prior Publication Data

US 2003/0115238 A1 Jun. 19, 2003

Related U.S. Application Data

(63) Continuation of application No. 08/787,617, filed on Jan. 23, 1997, now Pat. No. 6,532,521, which is a continuation-in-part of application No. 08/647,103, filed on May 7, 1996, now abandoned, which is a continuation-in-part of application No. 08/642,253, filed on May 2, 1996, now abandoned.
(60) Provisional application No. 60/010,527, filed on Jan. 24, 1996.

(51) Int. Cl.$^7$ .............................................. G06F 11/00
(52) U.S. Cl. .............................. 712/202; 711/6; 718/1
(58) Field of Search ........................ 712/217, 200–203, 712/215; 714/38; 711/6, 118; 718/1

(56) References Cited

U.S. PATENT DOCUMENTS 3,810,117 A    5/1974    Healey (Continued)

FOREIGN PATENT DOCUMENTS

EP          0 169 565         1/1986

(Continued)

OTHER PUBLICATIONS

XP000033120, author unknown, "Up Pops A 32Bit Stack Microprocessor", Electronic Engineering, vol. 61, No. 750, Jun. 1989, p. 79.

(Continued)

*Primary Examiner*—St. John Courtenay, III
(74) *Attorney, Agent, or Firm*—Gunnison, McKay & Hodgson, L.L.P.

(57) ABSTRACT

A memory architecture in accordance with an embodiment of the present invention improves the speed of method invocation. Specifically, method frames of method calls are stored in two different memory circuits. The first memory circuit stores the execution environment of each method call, and the second memory circuit stores parameters, variables or operands of the method calls. In one embodiment the execution environment includes a return program counter, a return frame, a return constant pool, a current method vector, and a current monitor address. In some embodiments, the memory circuits are stacks; therefore, the stack management unit to cache can be used to cache either or both memory circuits. The stack management unit can include a stack cache to accelerate data transfers between a stack-based computing system and the stacks. In one embodiment, the stack management unit includes a stack cache, a dribble manager unit, and a stack control unit. The dribble manager unit includes a fill control unit and a spill control unit. Since the vast majority of memory accesses to the stack occur at or near the top of the stack, the dribble manager unit maintains the top portion of the stack in the stack cache. When the stack-based computing system is popping data off of the stack and a fill condition occurs, the fill control unit transfer data from the stack to the bottom of the stack cache to maintain the top portion of the stack in the stack cache. Typically, a fill condition occurs as the stack cache becomes empty and a spill condition occurs as the stack cache becomes full.

42 Claims, 17 Drawing Sheets

U.S. PATENT DOCUMENTS

| | | | |
|---|---|---|---|
| 3,878,513 A | 4/1975 | Werner | |
| 3,889,243 A | 6/1975 | Drimak | |
| 3,924,245 A | 12/1975 | Eaton et al. | |
| 4,268,903 A | 5/1981 | Miki et al. | |
| 4,325,118 A | 4/1982 | DeVita et al. | 364/200 |
| 4,354,232 A | 10/1982 | Ryan | |
| 4,375,678 A | 3/1983 | Krebs, Jr. | |
| 4,524,416 A | 6/1985 | Stanley et al. | |
| 4,530,049 A | 7/1985 | Zee | |
| 4,600,986 A | 7/1986 | Scheuneman et al. | |
| 4,674,032 A | 6/1987 | Michaelson | |
| 4,761,733 A | 8/1988 | McCrocklin et al. | |
| 4,811,208 A | 3/1989 | Myers et al. | |
| 4,951,194 A | 8/1990 | Bradley et al. | |
| 5,043,870 A | 8/1991 | Ditzel et al. | |
| 5,093,777 A | 3/1992 | Ryan | |
| 5,107,457 A | 4/1992 | Hayes et al. | |
| 5,115,500 A | 5/1992 | Larsen | 395/425 |
| 5,142,635 A | 8/1992 | Saini | |
| 5,157,777 A | 10/1992 | Lai et al. | |
| 5,210,874 A | 5/1993 | Karger | |
| 5,377,339 A | 12/1994 | Saito et al. | |
| 5,471,591 A | 11/1995 | Edmondson et al. | |
| 5,471,602 A | 11/1995 | DeLano | |
| 5,481,684 A | 1/1996 | Richter et al. | 395/375 |
| 5,481,693 A | 1/1996 | Blomgren et al. | 395/375 |
| 5,485,572 A | 1/1996 | Overley | |
| 5,535,350 A | 7/1996 | Maemura | |
| 5,564,031 A | 10/1996 | Amerson et al. | 395/419 |
| 5,598,546 A | 1/1997 | Blomgren | 395/385 |
| 5,603,006 A | 2/1997 | Satake et al. | |
| 5,619,666 A | 4/1997 | Coon et al. | 395/384 |
| 5,630,066 A | 5/1997 | Gosling | 395/200.09 |
| 5,634,027 A | 5/1997 | Saito | |
| 5,636,362 A | 6/1997 | Stone et al. | |
| 5,638,525 A | 6/1997 | Hammond et al. | 395/385 |
| 5,687,336 A | 11/1997 | Shen et al. | |
| 5,761,408 A | 6/1998 | Kolawa et al. | |
| 5,784,553 A | 7/1998 | Kolawa et al. | |
| 5,805,918 A | 9/1998 | Blomgren et al. | 395/800.43 |
| 5,925,123 A | 7/1999 | Tremblay et al. | 712/212 |
| 6,076,155 A | 6/2000 | Blomgren et al. | |
| 6,532,531 B1 | 3/2003 | O'Connor et al. | |

FOREIGN PATENT DOCUMENTS

| | | |
|---|---|---|
| EP | 0 199 173 | 10/1986 |
| EP | 0 241 909 | 10/1987 |
| EP | 0 506 021 | 9/1992 |
| EP | 0 709 767 | 5/1996 |
| JP | S62-120542 | 6/1987 |
| JP | S62-232036 | 10/1987 |
| JP | 62-242243 | 10/1987 |
| JP | H4-363704 | 12/1992 |
| JP | 7-281897 | 10/1995 |

OTHER PUBLICATIONS

XP000042867, Atkinson, R.R., et al., "The Dragon Processor", Second International Conference on Architectural Support for Programming Languages and Operating Systems, No. 1987, Oct. 5, 1987, pp. 65–69.

XP002032257, Stanley et al., "A Performance Analysis of Automatically Managed Top of Stack Buffers", 14th Annual International Symposium on Computer Architecture, Jun. 2, 1987, pp. 272–281.

XP000002633, Burnley, P., "CPU Architecture for Realtime VME Systems", Microprocessors and Microsystems, London, BR, vol. 12, No. 3, Apr. 1988, pp. 153–158.

XP00413173, Lopriore, L., "Line Fetch/Prefetch in a Stack Cache Memory", Microprocessors and Micorosystems, vol. 17, No. 9, Nov. 1, 1993, pp. 547–555.

Microsoft Press Computer Dictionary, 2nd Ed., 1994, p. 279.

XP002030199, Moser, C. W., Jr., "Increasing an Instruction Set Without Increasing Word Length", Electronics, vol. 48, No. 3, Feb. 6, 1975, pp. 114–115.

XP000616964, Heuser, L. et al., "Language Constructs to Express Distribution of Object–oriented Applications", Technology of Object Oriented Languages & Systems Processings of the International Conference, Nov. 13, 1989, pp. 355–361.

XP000566684, Grogono, P., "Comments, Assertions, and Pragmas", SIGPLAN Notices, vol. 24, No. 3, Mar. 1, 1989, pp. 79–84.

XP000023134, "System/370 Emulator Assist Processor For a Reduced Instruction Set Computer", IBM Technical Disclosure Bulletin, vol. 30, No. 10, Mar. 1988, pp. 308–309.

XP000570180, van Hoff, A., "Java and Internet Programming", Dr. Dobbs Journal, vol. 20, No. 8, Aug. 1, 1995, pp. 56, 58, 60–61, 101–102.

XP002037753, Jensen, K. and Wirth, N., "PASCAL User Manual and Report," Springer–Verlag, N.Y., U.S., 1975, pp. 100–103.

Bakewell, H., Quammen, D. and Wang, P., "Mapping Concurrent Programs to VLIW Processors", Association for Computing Machinery, 1991, pp. 21–27.

"Pecan On UNIX" (Pecan's Pascal compiler) (product announcement), EXE. vol. 4, No. 11, May 1990, p. 8.

Takaaki, Higuchi, "Java and HotJava Extending WWW Functions", Nikkei Bite, vol. 144, Nikkei Business Pub. Inc., Nov. 1, 1995, pp. 256–269.

METHOD FRAME STORAGE USING MULTIPLE MEMORY CIRCUITS

RELATED APPLICATIONS

This application is a continuation of U.S. patent application Ser. No. 08/787,617, filed Jan. 23, 1997, entitled "METHOD FRAME STORAGE USING MULTIPLE MEMORY CIRCUITS," and naming James Michael O'Connor and Marc Tremblay as inventors, now U.S. Pat. No. 6,532,521, which is incorporated herein by reference in its entirety, and which claims the benefit of U.S. Provisional Application No. 60/010,527, filed Jan. 24, 1996, entitled "Methods and Apparatuses for Implementing the JAVA Virtual Machine" (JAVA is a trademark of Sun Microsystems, Inc.) and naming Marc Tremblay, James Michael O'Connor, Robert Garner, and William N. Joy as inventors, an is a continuation-in-part application of U.S. application Ser. No. 08/647,103, filed May 7, 1996, entitled "METHOD AND APPARATUS FOR STACK HARDWARE PARTITIONING FOR A STACK-BASED TYPE PROCESSOR" now abandoned naming James Michael O'Connor and Mark Tremblay as inventors and U.S. application Ser. No. 08/642,253, filed May 2, 1996, entitled "METHODS AND APPARATUSES FOR IMPLEMENTING OPERAND STACK CACHE AS A CIRCULAR BUFFER" now abandoned and naming Marc Tremblay and James Michael O'Connor as inventors both of which also claimed the benefit of U.S. Provisional Application No. 60/010,527, filed Jan. 24, 1996, entitled "Methods and Apparatuses for Implementing the JAVA Virtual Machine" and naming Marc Tremblay, James Michael O'Connor, Robert Garner, and William N. Joy as inventors.

REFERENCE TO APPENDIX I

A portion of the disclosure of this patent document including Appendix I, The JAVA Virtual Machine Specification and Appendix A thereto, contains material which is subject to copyright protection. The copyright owner has no objection to the facsimile reproduction by anyone of the patent document or the patent disclosure, as it appears in the U.S. Patent and Trademark Office patent files or records, but otherwise reserves all copyright rights whatsoever.

BACKGROUND OF THE INVENTION

1. Field of the Invention

The present invention relates generally to computer systems and, in particular, to a memory architecture using multiple memory circuits to store information for a method call.

2. Discussion of Related Art

Many individuals and organizations in the computer and communications industries tout the Internet as the fastest growing market on the planet. In the 1990s, the number of users of the Internet appears to be growing exponentially with no end in sight. In June of 1995, an estimated 6,642,000 hosts were connected to the Internet; this represented an increase from an estimated 4,852,000 hosts in January, 1995. The number of hosts appears to be growing at around 75% per year. Among the hosts, there were approximately 120,000 networks and over 27,000 web servers. The number of web servers appears to be approximately doubling every 53 days.

In July 1995, with over 1,000,000 active Internet users, over 12,505 usenet news groups, and over 10,000,000 usenet readers, the Internet appears to be destined to explode into a very large market for a wide variety of information and multimedia services.

In addition, to the public carrier network or Internet, many corporations and other businesses are shifting their internal information systems onto an intranet as a way of more effectively sharing information within a corporate or private network. The basic infrastructure for an intranet is an internal network connecting servers and desktops, which may or may not be connected to the Internet through a firewall. These intranets provide services to desktops via standard open network protocols which are well established in the industry. Intranets provide many benefits to the enterprises which employ them, such as simplified internal information management and improved internal communication using the browser paradigm. Integrating Internet technologies with a company's enterprise infrastructure and legacy systems also leverages existing technology investment for the party employing an intranet. As discussed above, intranets and the Internet are closely related, with intranets being used for internal and secure communications within the business and the Internet being used for external transactions between the business and the outside world. For the purposes of this document, the term "networks" includes both the Internet and intranets. However, the distinction between the Internet and an intranet should be born in mind where applicable.

In 1990, programmers at Sun Microsystem wrote a universal programming language. This language was eventually named the JAVA programming language. (JAVA is a trademark of Sun Microsystems of Mountain View, Calif.) The JAVA programming language resulted from programing efforts which initially were intended to be coded in the C++ programming language; therefore, the JAVA programming language has many commonalties with the C++ programming language. However, the JAVA programming language is a simple, object-oriented, distributed, interpreted yet high performance, robust yet safe, secure, dynamic, architecture neutral, portable, and multi-threaded language.

The JAVA programing language has emerged as the programming language of choice for the Internet as many large hardware and software companies have licensed it from Sun Microsystems. The JAVA programming language and environment is designed to solve a number of problems in modern programming practice. The JAVA programming language omits many rarely used, poorly understood, and confusing features of the C++ programming language. These omitted feature primarily consist of operator overloading, multiple inheritance, and extensive automatic coercions. The JAVA programming language includes automatic garbage collection that simplifies the task of programming because it is no longer necessary to allocate and free memory as in the C programming language. The JAVA programming language restricts the use of pointers as defined in the C programming language, and instead has true arrays in which array bounds are explicitly checked, thereby eliminating vulnerability to many viruses and nasty bugs. The JAVA programming language includes objective-C interfaces and specific exception handlers.

The JAVA programming language has an extensive library of routines for coping easily with TCP/IP protocol (Transmission Control Protocol based on Internet protocol), HTTP (Hypertext Transfer Protocol) and FTP (File Transfer Protocol). The JAVA programming language is intended to be used in networked/distributed environments. The JAVA programming language enabled the construction of virus-free, tamper-free systems. The authentication techniques are based on public-key encryption.

Many computing systems, including those implementing the JAVA virtual machine, can execute multiple methods each of which has a method frame. Typically, method invocation significantly impacts the performance of the computing system due to the excessive number of memory accesses method invocation requires. Therefore, a method and memory architecture targeted to reduce the latency caused by method invocation is desirable.

SUMMARY OF THE INVENTION

Accordingly, the present invention provides a memory architecture to improve the speed of method invocation. Specifically, method frames are stored in two different memory circuits. The first memory circuit stores the execution environment of each method call, and the second memory circuit stores parameters, variables or operands of the method calls. In one embodiment, the execution environment includes a return program counter, a return frame, a return constant pool, a current method vector, and a current monitor address. In some embodiments, the memory circuits are stacks; therefore, the stack management unit can be used to cache either or both memory circuits.

The stack management unit includes a stack cache to accelerate data transfers between the stack-based computing system and the stack. In one embodiment, the stack management unit includes a stack cache, a dribble manager unit, and a stack control unit. Since the vast majority of memory accesses to the stack occur at or near the top of the stack, the dribble manager unit maintains the top portion of the stack in the stack cache. Specifically, when the stack-based computing system is pushing data onto the stack and the stack cache is almost full, the dribble manager unit transfers data from the bottom of the stack cache to the stack so the top portion of the stack remains in the stack cache. When the stack-based computing system is popping data off the stack and the stack cache is becoming empty, the dribble manager unit transfers data from the stack to the bottom of the stack cache to maintain the top portion of the stack in the stack cache.

The stack cache includes a stack cache memory circuit, one or more read ports, and one or more write ports. In one embodiment the stack cache memory circuit is a register file configured in a circular buffer memory architecture. For the circular buffer architecture, the registers an be addressed using modulo addressing. Typically, an OPTOP pointer is used to define and point to the top memory location in the stack cache memory circuit and a bottom pointer is used to define and point to the bottom memory location in the stack cache memory circuit. To avoid confusion, if the stack management unit is used for the execution environment, a FRAME pointer is used to define and point to the top memory location. As data words are pushed or popped off the stack, the OPTOP pointer is incremented or decremented, respectively. Similarly, as data words are spilled or filled between the stack cache memory circuit and the stack, the bottom pointer is incremented or decremented, respectively.

Some embodiments of the stack management unit include a fill control unit and a spill control unit. If the fill control unit detects a fill condition, the fill control unit transfers data from the stack to the stack cache memory circuit. In one embodiment of the stack management unit, a fill condition occurs if the OPTOP pointer is greater than a high water mark. In another embodiment, a fill condition occurs if the number of free memory locations in the stack cache memory circuit is greater than a low cache threshold or the number of used memory locations is less than the low cache threshold. Typically, the low water mark and the low cache threshold are stored in programmable registers. The number of free memory locations can be determined with a modulo subtractor.

In one embodiment of the stack management unit, a spill condition occurs if the OPTOP pointer is less than a low water mark. In another embodiment, a spill condition occurs if the number of free locations in the stack cache memory circuit is less than a high cache threshold or the number of used memory locations is greater than the high cache threshold. Typically, the low water mark and the low cache threshold are stored in programmable registers. The number of free memory locations can be determined with a modulo subtractor.

Figure 1A:
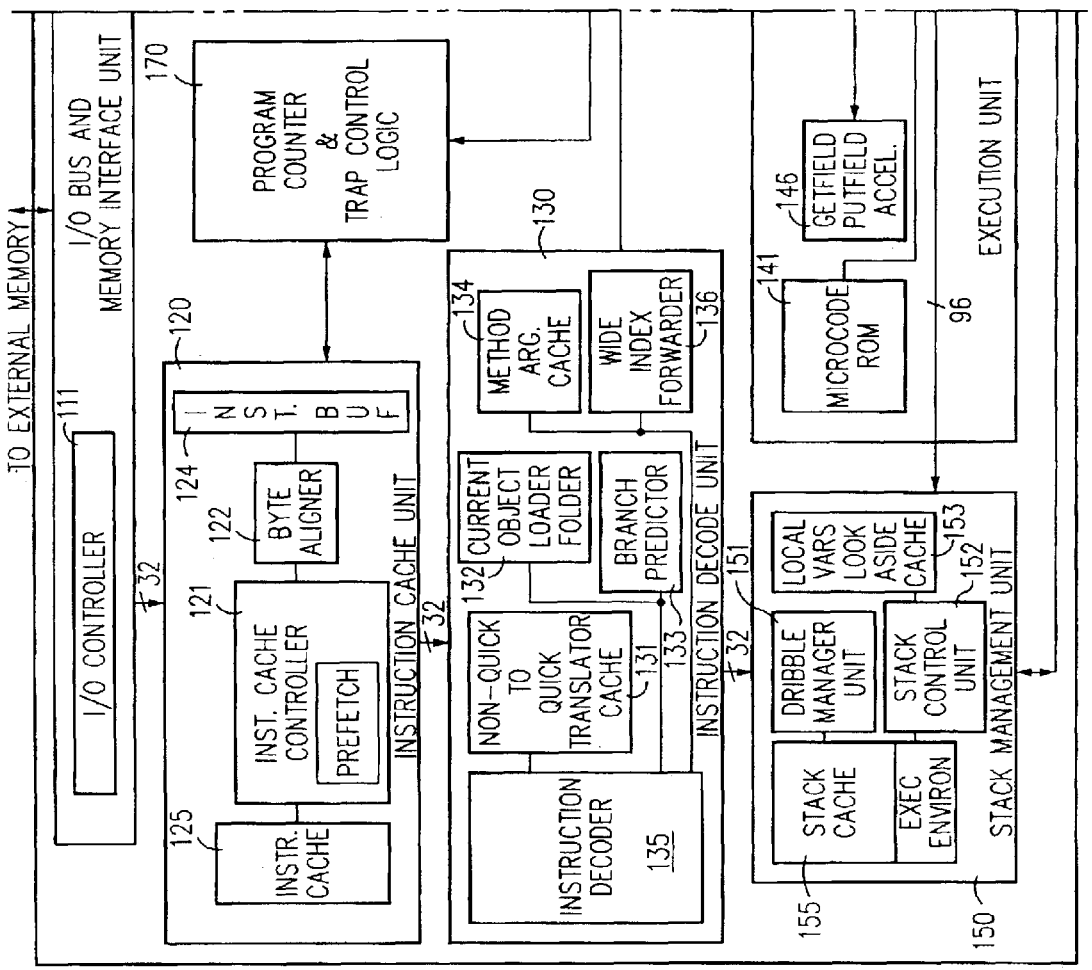
FIG. 1 is a key to FIGS. 1A and 1B, which are a block diagram of one embodiment of a virtual machine hardware processor that utilizes the memory architecture of this invention to store method frames.

These and other features and advantages of the present invention will be apparent from the Figures as explained in the Detailed Description of the Invention. Like or similar features are designated by the same reference numeral(s) throughout the drawings and the Detailed Description of the Invention.

DETAILED DESCRIPTION OF THE INVENTION

Figure 1B:
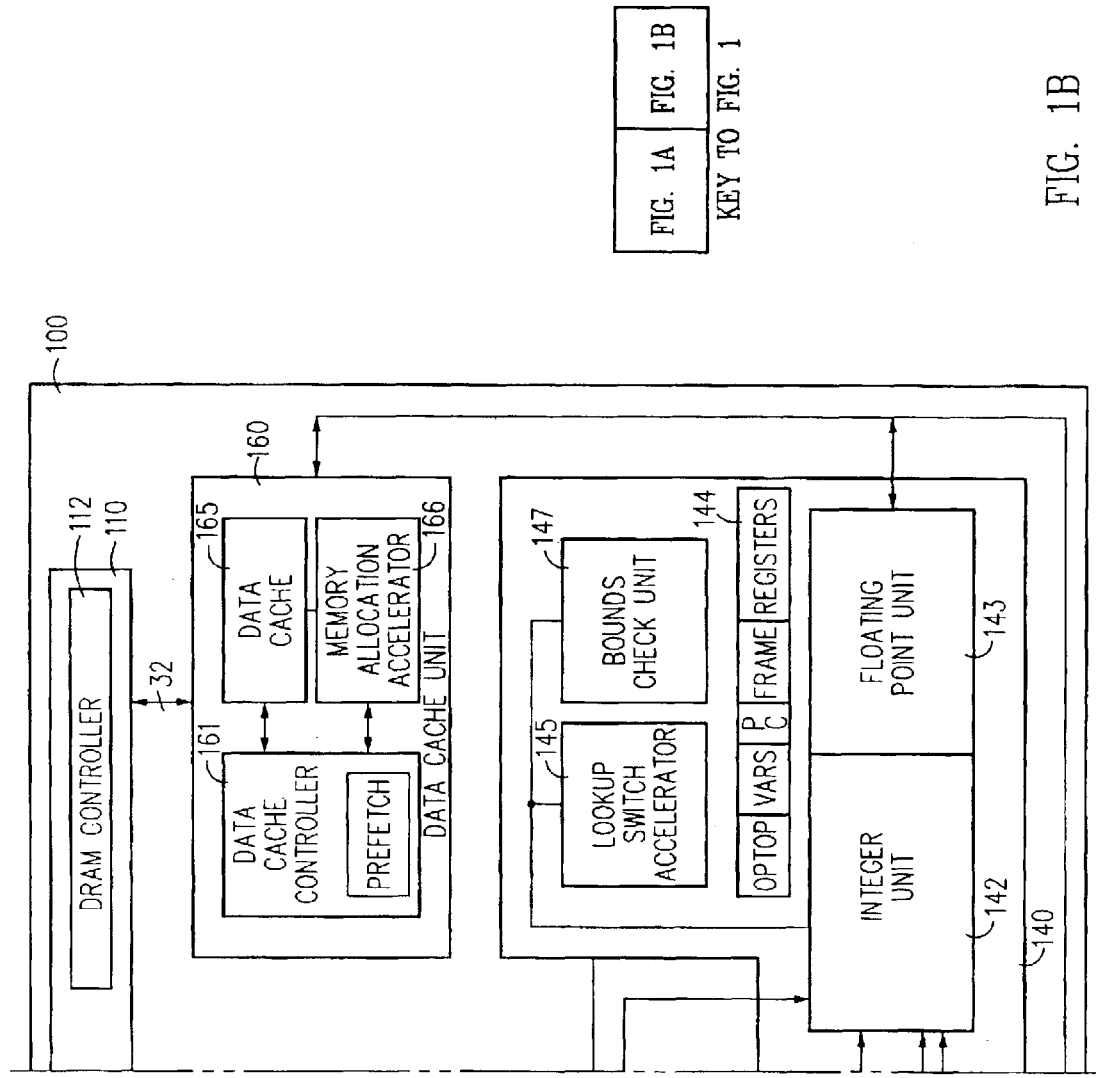

FIG. 1 illustrates one embodiment of a virtual machine instruction hardware processor 100, hereinafter hardware processor 100, that includes a memory architecture in accordance with the present invention to store method frames, and that directly executes virtual machine instructions that are processor architecture independent. The performance of hardware processor 100 in executing JAVA virtual machine instructions is much better than high-end CPUs, such as the Intel PENTIUM microprocessor or the Sun Microsystems ULTRASPARC processor, (ULTRASPARC is a trademark of Sun Microsystems of Mountain View, Calif., and PENTIUM is a trademark of Intel Corp. of Sunnyvale, Calif.) interpreting the same virtual machine instructions with a software JAVA interpreter. or with a JAVA just-in-time compiler; is low cost; and exhibits low power consumption. As a result, hardware processor 100 is well suited for portable applications. Hardware processor 100 provides similar advantages for other virtual machine stack-based architectures as well as for virtual machines utilizing features such as garbage collection, thread synchronization, etc.

In view of these characteristics, a system based on hardware processor 100 presents attractive price for performance characteristics, if not the best overall performance, as compared with alternative virtual machine execution environments including software interpreters and just-in-time compilers. Nonetheless, the present invention is not limited to virtual machine hardware processor embodiments, and encompasses any suitable stack-based, or non-stack-based machine implementations, including implementations emulating the JAVA virtual machine as a software interpreter, compiling JAVA virtual machine instructions (either in batch or just-in-time) to machine instruction native to a particular hardware processor, or providing hardware implementing the JAVA virtual machine in microcode, directly in silicon, or in some combination thereof.

Regarding price for performance characteristics, hardware processor 100 has the advantage that the 250 Kilobytes to 500 Kilobytes (Kbytes) of memory storage, e.g., read-only memory or random access memory, typically required by a software interpreter, is eliminated.

A simulation of hardware processor 100 showed that hardware processor 100 executes virtual machine instructions twenty times faster than a software interpreter running on a variety of applications on a PENTIUM processor clocked at the same clock rate as hardware processor 100, and executing the same virtual machine instructions. Another simulation of hardware processor 100 showed that hardware processor 100 executes virtual machine instructions five times faster than a just-in-time compiler running on a PENTIUM processor running at the same clock rate as hardware processor 100, and executing the same virtual machine instructions.

In environments in which the expense of the memory required for a software virtual machine instruction interpreter is prohibitive, hardware processor 100 is advantageous. These applications include, for example, an Internet chip for network appliances, a cellular telephone processor, other telecommunications integrated circuits, or other low-power, low-cost applications such as embedded processors, and portable devices.

The present invention increases the speed of method invocation by using an execution environment memory 440 in conjunction with stack 400B. The execution environment of various method calls are stored in execution environment memory 440 while the operands, variables and parameters of the method calls are stored in stack 400B. Both execution environment memory 440 and stack 400B can include a stack management unit 150 that utilizes a stack cache 155 to accelerate data transfers for execution unit 140. Although, stack management unit 150 can be an integral part of hardware processor 100 as shown in FIG. 1, many embodiments of stack management unit 150 are not integrated with a hardware processor since stack management in accordance with the present invention can be adapted for use with any stack-based computing system. In one embodiment, stack management unit 150 includes a stack cache 155, a dribble manager unit 151, and a stack control unit 152. When hardware processor 100 is pushing data onto stack 400 (FIG. 4A) and stack cache 155 is almost full dribble manager unit 151 transfers data from the bottom of stack cache 155 to stack 400 through data cache unit 160, so that the top portion of stack 400 remains in stack cache 155. When hardware processor 100 is popping data off stack 400 and stack cache 155 is almost empty, dribble manager unit 151 transfers data from stack 400 to the bottom of stack cache 155 so that the top portion of stack 400 is maintained in stack ache 155.

As used herein, a virtual machine is an abstract computing machine that, like a real computing machine, has an instruction set and uses various memory areas. A virtual machine specification defines a set of processor architecture independent virtual machine instructions that are executed by a virtual machine implementation, e.g., hardware processor 100. Each virtual machine instruction defines a specific operation that is to be performed. The virtual computing machine need not understand the computer language that is used to generate virtual machine instructions or the underlying implementation of the virtual machine. Only a particular file format for virtual machine instructions needs to be understood.

In an exemplary embodiment, the virtual machine instructions are JAVA virtual machine instructions. Each JAVA virtual machine instruction includes one or more bytes that encode instruction identifying information, operands, and any other required information. Appendix I, which is incorporated herein by reference in its entirety, includes an illustrative set of the JAVA virtual machine instructions. The particular set of virtual machine instructions utilized is not an essential aspect of this invention. In view of the virtual machine instructions in Appendix I and this disclosure, those of skill in the art can modify the invention for a particular set of virtual machine instructions, or for changes to the JAVA virtual machine specification.

Figure 2:
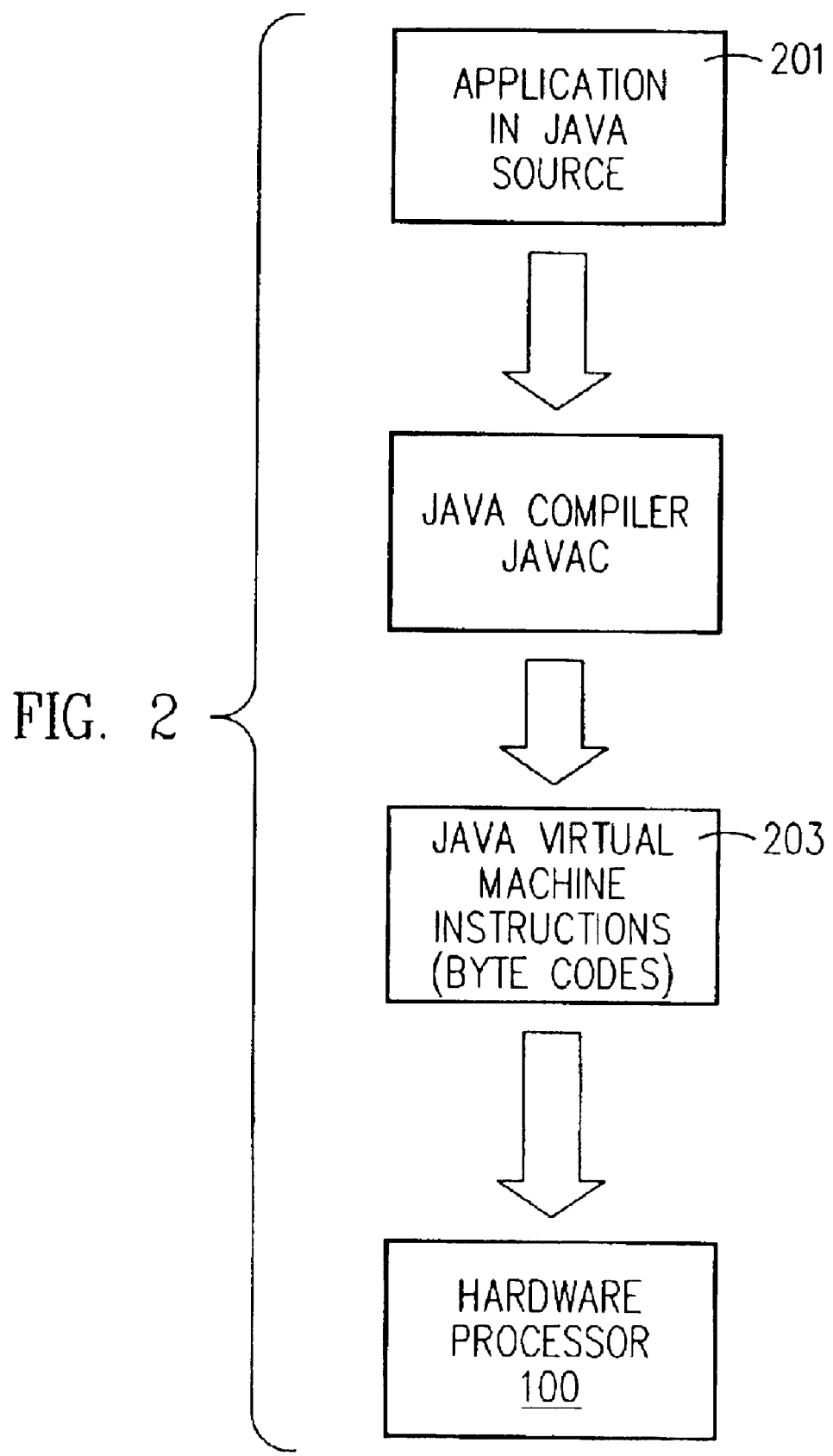
FIG. 2 is a process flow diagram for generation of virtual machine instructions that are used in one embodiment of this invention.

A JAVA compiler JAVAC, (FIG. 2) that is executing on a computer platform, converts an application 201 written in the JAVA computer language to an architecture neutral object file format encoding a compiled instruction sequence 203, according to the JAVA Virtual Machine Specification, that includes a compiled instruction set. However, for this invention, only a source of virtual machine instructions and related information is needed. The method or technique used to generate the source of virtual machine instructions and related information is not essential to this invention.

Compiled instruction sequence 203 is executable on hardware processor 100 as well as on any computer platform that implements the JAVA virtual machine using, for example, a software interpreter or just-in-time compiler. However, as described above, hardware processor 100 provides significant performance advantages over the software implementations.

In this embodiment, hardware processor 100 (FIG. 1) processes the JAVA virtual machine instructions, which include bytecodes. Hardware processor 100, as explained more completely below, executes directly most of the bytecodes. However, execution of some of the bytecodes is implemented via microcode.

One strategy for selecting virtual machine instructions that are executed directly by hardware processor 100 is described herein by way of an example. Thirty percent of the JAVA virtual machine instructions are pure hardware translations; instructions implemented in this manner include constant loading and simple stack operations. The next 50% of the virtual machine instructions are implemented mostly, but not entirely, in hardware and require some firmware assistance; these include stack based operations and array instructions. The next 10% of the JAVA virtual machine instructions are implemented in hardware, but require significant firmware support as well; these include function invocation and function return. The remaining 10% of the JAVA virtual machine instructions are not supported in hardware, but rather are supported by a firmware trap and/or microcode; these include functions such as exception handlers. Herein, firmware means microcode stored in ROM that when executed controls the operations of hardware processor 100.

In one embodiment, hardware processor 100 includes an I/O bus and memory interface unit 110, an instruction cache unit 120 including instruction cache 125, an instruction decode unit 130, a unified execution unit 140, a stack management unit 150 including stack cache 155, a data cache unit 160 including a data cache 165, and program counter and trap control logic 170. Each of these units is described more completely below.

Also, as illustrated in FIG. 1, each unit includes several elements. For clarity and to avoid distracting from the invention, the interconnections between elements within a unit are not shown in FIG. 1. However, in view of the following description, those of skill in the art will understand the interconnections and cooperation between the elements in a unit and between the various units.

The pipeline stages implemented using the units illustrated in FIG. 1 include fetch, decode, execute, and write-back stages. If desired, extra stages for memory access or exception resolution are provided in hardware processor 100.

Figure 3:
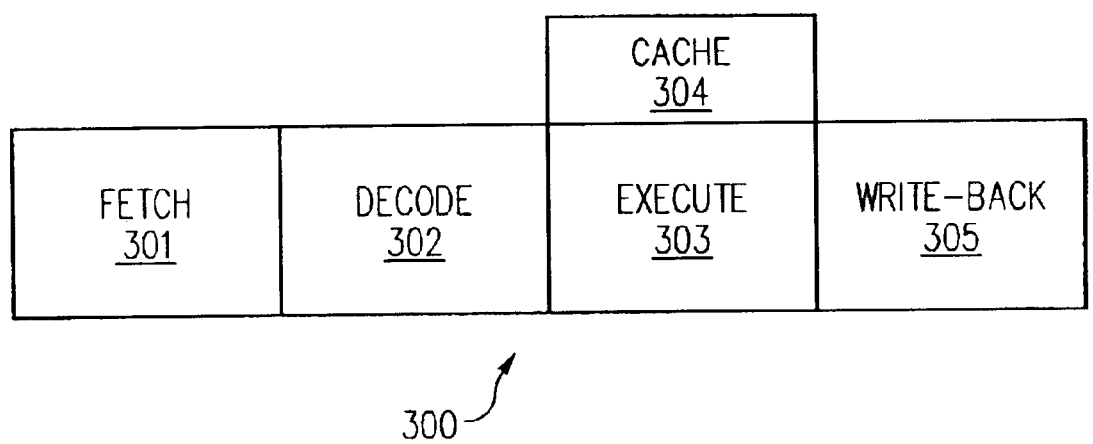
FIG. 3 illustrates an instruction pipeline implemented in the hardware processor of FIG. 1.

FIG. 3 is an illustration of a four stage pipeline for execution of instructions in the exemplary embodiment of processor 100. In fetch stage 301, a virtual machine instruction is fetched and placed in instruction buffer 124 (FIG. 1). The virtual machine instruction is fetched from one of (i) a fixed size cache line from instruction cache 125 or (ii) external memory.

With regard to fetching, aside from instructions tableswitch and lookupswitch, (See Appendix I.) each virtual machine instruction is between one and five bytes long. Thus, to keep things simple, at least forty bits are required to guarantee that all of a given instruction is contained in the fetch.

Another alternative is to always fetch a predetermined number of bytes, for example, four bytes, starting with the opcode. This is sufficient for 95% of JAVA virtual machine instructions (See Appendix I). For an instruction requiring more than three bytes of operands, another cycle in the front end must be tolerated if four bytes are fetched. In this case, the instruction execution can be started with the first operands fetched even if the full set of operands is not yet available.

In decode stage 302 (FIG. 3), the virtual machine instruction at the front of instruction buffer 124 (FIG. 1) is decoded and instruction folding is performed if possible. Stack cache 155 is accessed only if needed by the virtual machine instruction. Register OPTOP, that contains a pointer OPTOP to a top of a stack 400 (FIGS. 4A and B), is also updated in decode stage 302 (FIG. 3).

Herein, for convenience, the value in a register and the register are assigned the same reference numeral. Further, in the following discussion, use of a register to store a pointer is illustrative only of one embodiment. Depending on the specific implementation of the invention, the pointer may be implemented using a hardware register, a hardware counter, a software counter, a software pointer, or other equivalent embodiments known to those of skill in the art. The particular implementation selected is not essential to the invention, and typically is made based on a price to performance trade-off.

In execute stage 303, the virtual machine instruction is executed for one or more cycles. Typically, in execute stage 303, an ALU in integer unit 142 (FIG. 1) is used either to do an arithmetic computation or to calculate the address of a load or a store from data cache unit (DCU) 160. If necessary, traps are prioritized and taken at the end of execute stage 303 (FIG. 3). For control flow instructions, the branch address is calculated in execute stage 303, as well as the condition upon which the branch is dependent.

Cache stage 304 is a non-pipelined stage. Data cache 165 (FIG. 1) is accessed if needed during execution stage 303 (FIG. 3). The reason that stage 304 is non-pipelined is because hardware processor 100 is a stack-based machine. Thus, the instruction following a load is almost always dependent on the value returned by the load. Consequently, in this embodiment, the pipeline is held for one cycle for a data cache access. This reduces the pipeline stages, and the die area taken by the pipeline for the extra registers and bypasses.

Write-back stage 305 is the last stage in the pipeline. In stage 305, the calculated data is written back to stack cache 155.

Hardware processor 100, in this embodiment, directly implements a stack 400 (FIG. 4A) that supports the JAVA virtual machine stack-based architecture (See Appendix I). Sixty-four entries on stack 400 are contained on stack ache 155 in stack management unit 150. Some entries in stack 400 may be duplicated on stack cache 155. Operations on data are performed through stack cache 155.

Stack 400 of hardware processor 100 is primarily used as a repository of information for methods. At any point in time, hardware processor 100 is executing a single method. Each method has memory space, i.e., a method frame on stack 400, allocated for a set of local variables, an operand stack, and an execution environment structure.

A new method frame, e.g., method frame two 410, is allocated by hardware processor 100 upon a method invocation in execution stage 303 (FIG. 3) and becomes the current frame, i.e., the frame of the current method. Current frame 410 (FIG. 4A), as well as the other method frames, may contain a part of or all of the following six entities, depending on various method invoking situations:

Object reference;

Incoming arguments;

Local variables;

Invoker's method context;

Operand stack; and

Return value from method.

Figure 4A:
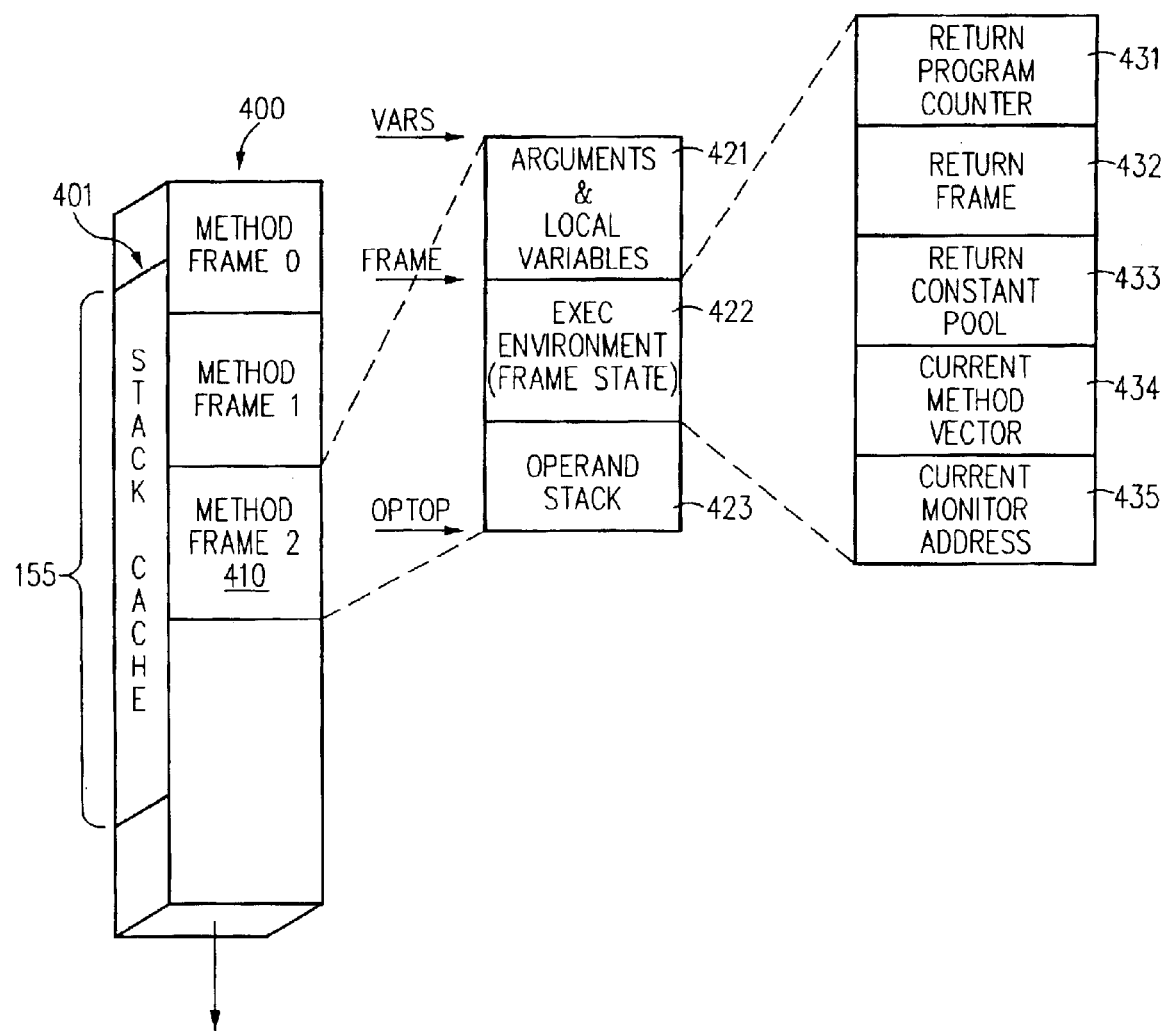
FIG. 4A is an illustration of the one embodiment of the logical organization of a stack structure where each method frame includes a local variable storage area, an environment storage area, and an operand stack utilized by the hardware processor of FIG. 1.

In FIG. 4A, object reference, incoming arguments, and local variables are included in arguments and local variables area 421. The invoker's method context is included in execution environment 422, sometimes called frame state, that in turn includes: a return program counter value 431 that is the address of the virtual machine instruction, e.g., JAVA opcode, next to the method invoke instruction; a return frame 432 that is the location of the calling method's frame; a return constant pool pointer 433 that is a pointer to the calling method's constant pool table; a current method vector 434 that is the base address of the current method's vector table; and a current monitor address 435 that is the address of the current method's monitor.

The object reference is an indirect pointer to an object-storage representing the object being targeted for the method invocation. JAVA compiler JAVAC (See FIG. 2.) generates an instruction to push this pointer onto operand stack 423 prior to generating an invoke instruction. This object reference is accessible as local variable zero during the execution of the method. This indirect pointer is not available for a static method invocation as there is no target-object defined for a static method invocation.

The list of incoming arguments transfers information from the calling method to the invoked method. Like the object reference, the incoming arguments are pushed onto stack 400 by JAVA compiler generated instructions and may be accessed as local variables. JAVA compiler JAVAC (See FIG. 2.) statically generates a list of arguments for current method 410 (FIG. 4A), and hardware processor 100 determines the number of arguments from the list. When the object reference is present in the frame for a non-static method invocation, the first argument is accessible as local variable one. For a static method invocation, the first argument becomes local variable zero.

For 64-bit arguments, as well as 64-bit entities in general, the upper 32-bits, i.e., the 32 most significant bits, of a 64-bit entity are placed on the upper location of stack 400, i.e., pushed on the stack last. For example, when a 64-bit entity is on the top of stack 400, the upper 32-bit portion of the 64-bit entity is on the top of the stack, and the lower 32-bit portion of the 64-bit entity is in the storage location immediately adjacent to the top of stack 400.

The local variable area on stack 400 (FIG. 4A) for current method 410 represents temporary variable storage space, which is allocated and remains effective during invocation of method 410. JAVA compiler JAVAC (FIG. 2) statically determines the required number of local variables and hardware processor 100 allocates temporary variable storage space accordingly.

When a method is executing on hardware processor 100, the local variables typically reside in stack cache 155 and are addressed as offsets from pointer VARS (FIGS. 1 and 4A), which points to the position of the local variable zero. Instructions are provided to load the values of local variables onto operand stack 423 and store values from operand stack into local variables area 421.

The information in execution environment 422 includes the invoker's method context. When a new frame is built for the current method, hardware processor 100 pushes the invoker's method context onto newly allocated frame 410, and later utilizes the information to restore the invoker's method context before returning. Pointer FRAME (FIGS. 1 and 4A) is a pointer to the execution environment of the current method. In the exemplary embodiment, each register in register set 144 (FIG. 1) is 32-bits wide.

Operand stack 423 is allocated to support the execution of the virtual machine instructions within the current method. Program counter register PC (FIG. 1) contains the address of the next instruction, e.g., opcode, to be executed. Locations on operand stack 423 (FIG. 4A) are used to store the operands of virtual machine instructions, providing both source and target storage locations for instruction execution. The size of operand stack 423 is statically determined by JAVA compiler JAVAC (FIG. 2) and hardware processor 100 allocates space for operand stack 423 accordingly. Register OPTOP (FIGS. 1 and 4A) holds a pointer to a top of operand stack 423.

The invoked method may return its execution result onto the invoker's top of stack, so that the invoker can access the return value with operand stack references. The return value is placed on the area where an object reference or an argument is pushed before a method invocation.

Simulation results on the JAVA virtual machine indicate that method invocation consumes a significant portion of the execution time (20–40%). Given this attractive target for accelerating execution of virtual machine instructions, hardware support for method invocation is included in hardware processor 100, as described more completely below.

The beginning of the stack frame of a newly invoked method, i.e., the object reference and the arguments passed by the caller, are already stored on stack 400 since the object reference and the incoming arguments come from the top of the stack of the caller. As explained above, following these items on stack 400, the local variables are loaded and then the execution environment is loaded.

One way to speed up this process is for hardware processor 100 to load the execution environment in the background and indicate what has been loaded so far, e.g., simple one bit scoreboarding. Hardware processor 100 tries to execute the bytecodes of the called method as soon as possible, even though stack 400 is not completely loaded. If accesses are made to variables already loaded, overlapping of execution with loading of stack 400 is achieved, otherwise a hardware interlock occurs and hardware processor 100 just waits for the variable or variables in the execution environment to be loaded.

Figure 4B:
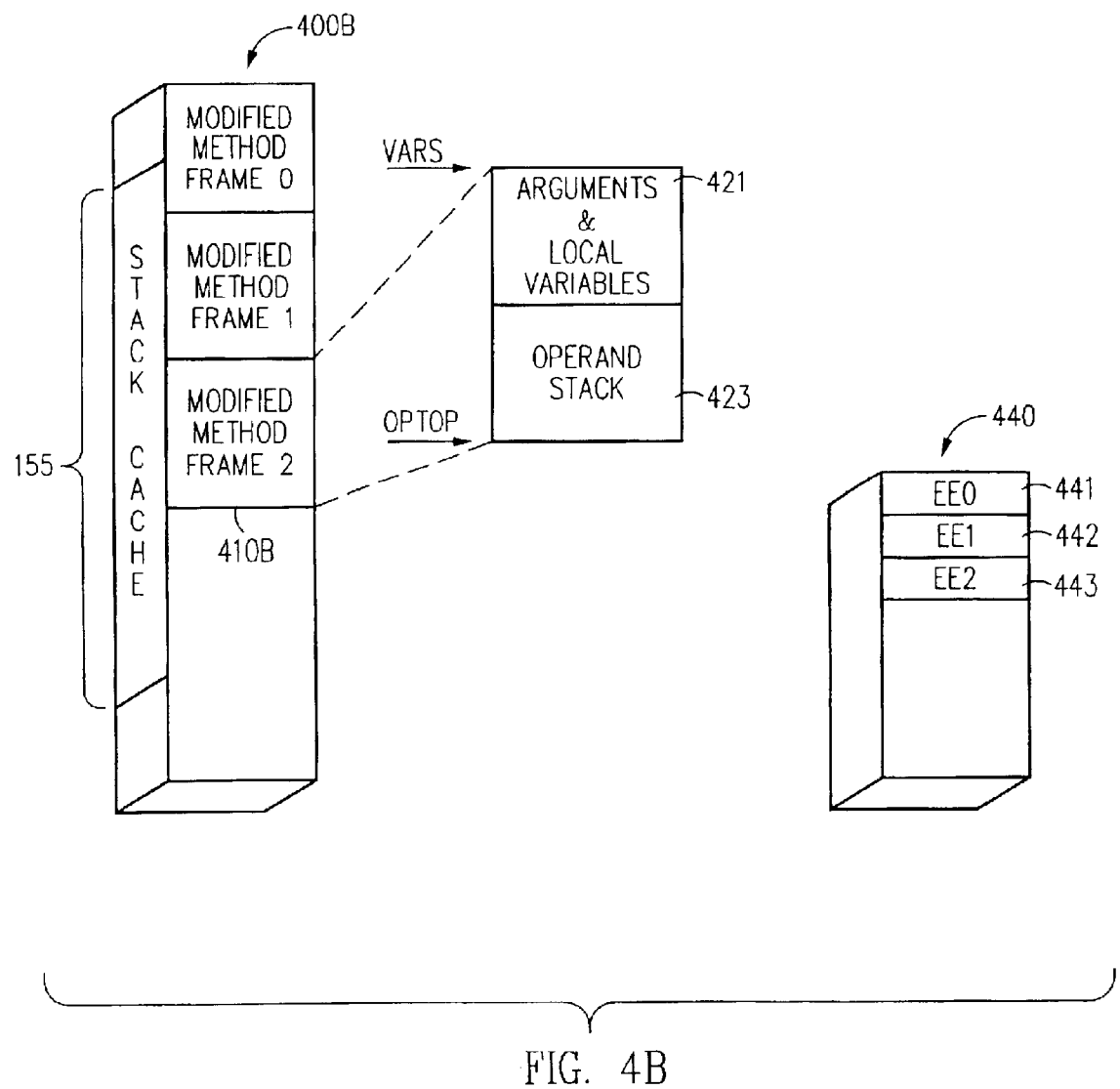
FIG. 4B is an illustration of an alternative embodiment of the logical organization of a stack structure where each method frame includes a local variable storage area and an operand stack on the stack, and an environment storage area for the method frame is included on a separate execution environment stack.

FIG. 4B illustrates another way to accelerate method invocation. Instead of storing the entire method frame in stack 400, the execution environment of each method frame is stored separately from the local variable area and the operand stack of the method frame. Thus, in this embodiment, stack 400B contains modified method frames, e.g., modified method frame 410B having only local variable area 421 and operand stack 423. Execution environment 42 of the method frame is stored in execution environment memory 440. Storing the execution environment in execution environment memory 440 reduces the amount of data in stack cache 155. Therefore, the size of stack cache 155 can be reduced. Furthermore, execution environment memory 440 and stack cache 155 can be accessed simultaneously. Thus, method invocation can be accelerated by loading or storing the execution environment in parallel with loading or storing data onto stack 400B.

In one embodiment of stack management unit 150, the memory architecture of execution environment memory 440 is also a stack. As modified method frames are pushed onto stack 400B through stack cache 155, corresponding execution environments are pushed onto execution environment memory 440. For example, since modified method frames 0 to 2, as show in FIG. 4B, are in stack 400B, execution environments (EE) 0 to 2, respectively, are stored in execution environment memory circuit 440.

To further enhance method invocation, an execution environment cache can be added to improve the speed of saving and retrieving the execution environment during method invocation. The architecture described more completely below for stack cache 155, dribbler manager unit 151, and stack control unit 152 for caching stack 400, can also be applied to caching execution environment memory 440.

Figure 4C:
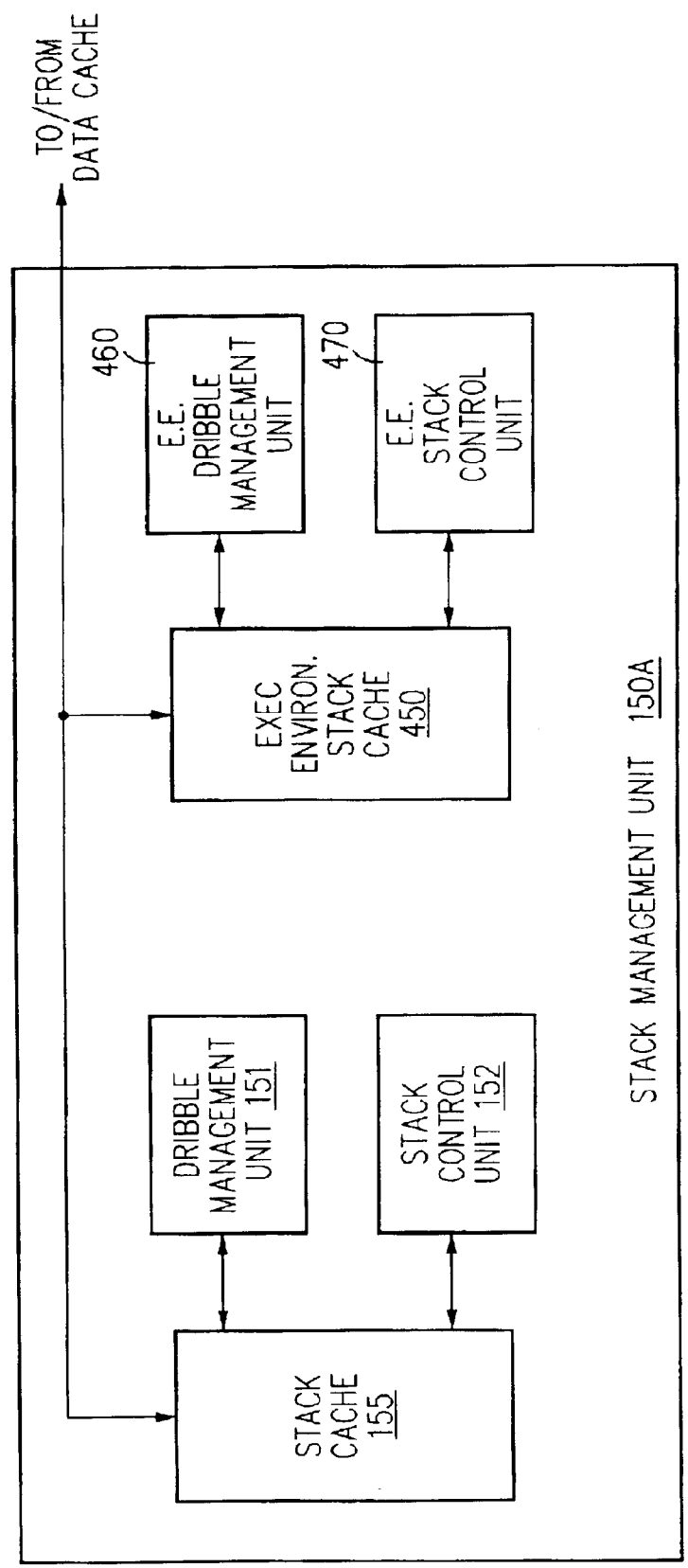
FIG. 4C is an illustration of an alternative embodiment of the stack management unit for the stack and execution environment stack of FIG. 4B.

FIG. 4C illustrates an embodiment of stack management unit 150 modified to support both stack 400B and execution environment memory 440. Specifically, the embodiment of stack management unit 150 in FIG. 4C adds an execution environment stack cache 450, an execution environment dribble manager unit 460, and an execution environment stack control unit 470. Typically, execution dribble manager unit 460 transfers an entire execution environment between execution environment cache 450 and execution environment memory 440 during a spill operation or a fill operation.

I/O Bus and Memory Interface Unit

I/O bus and memory interface unit 110 (FIG. 1), sometimes called interface unit 110, implements an interface between hardware processor 100 and a memory hierarchy which in an exemplary embodiment includes external memory and may optionally include memory storage and/or interfaces on the same die as hardware processor 100. In this embodiment, I/O controller 111 interfaces with external I/O devices and memory controller 112 interfaces with external memory. Herein, external memory means memory external to hardware processor 100. However, external memory either may be included on the same die as hardware processor 100, may be external to the die containing hardware processor 100, or may include both on and off-die portions.

In another embodiment, requests to I/O devices go through memory controller 112, which maintains an address map of the entire system including hardware processor 100. On the memory bus of this embodiment, hardware processor 100 is the only master and does not have to arbitrate to use the memory bus.

Hence, alternatives for the input/output bus that interfaces with I/O bus and memory interface unit 110 include supporting memory-mapped schemes, providing direct support for PCI, PCMCIA, or other standard busses. Fast graphics (w/VIS or other technology) may optionally be included on the die with hardware processor 100.

I/O bus and memory interface unit 110 generates read and write requests to external memory. Specifically, interface unit 110 provides an interface for instruction cache and data cache controllers 121 and 161 to the external memory. Interface unit 110 includes arbitration logic for internal requests from instruction cache controller 121 and data cache controller 161 to access external memory and in response to a request initiates either a read or a write request on the memory bus to the external memory. A request from data cache controller 161 is always treated as higher priority relative to a request from instruction cache controller 121.

Interface unit 110 provides an acknowledgment signal to the requesting instruction cache controller 121, or data cache controller 161 on read cycles so that the requesting controller can latch the data. On write cycles, the acknowledgment signal from interface unit 110 is used for flow control so that the requesting instruction cache controller 121 or data cache controller 161 does not generate a new request when there is one pending. Interface unit 110 also handles errors generated on the memory bus to the external memory.

Instruction Cache Unit

Instruction cache unit (ICU) 120 (FIG. 1) fetches virtual machine instructions from instruction cache 125 and provides the instructions to instruction decode unit 130. In this embodiment, upon a instruction cache hit, instruction cache controller 121, in one cycle, transfers an instruction from instruction cache 125 to instruction buffer 124 where the instruction is held until integer execution unit IEU, that is described more completely below, is ready to process the instruction. This separates the rest of pipeline 300 (FIG. 3) in hardware processor 100 from fetch stage 301. If it is undesirable to incur the complexity of supporting an instruction-buffer type of arrangement, a temporary one instruction register is sufficient for most purposes. However, instruction fetching, caching, and buffering should provide sufficient instruction bandwidth to support instruction folding as described below.

The front end of hardware processor 100 is largely separate from the rest of hardware processor 100. Ideally, one instruction per cycle is delivered to the execution pipeline.

The instructions are aligned on an arbitrary eight-bit boundary by byte aligner circuit 122 in response to a signal from instruction decode unit 130. Thus, the front end of hardware processor 100 efficiently deals with fetching from any byte position. Also, hardware processor 100 deals with the problems of instructions that span multiple cache lines of cache 125. In this case, since the opcode is the first byte, the design is able to tolerate an extra cycle of fetch latency for the operands. Thus, a very simple de-coupling between the fetching and execution of the bytecodes is possible.

In case of an instruction cache miss, instruction cache controller 121 generates an external memory request for the missed instruction to I/O bus and memory interface unit 110. If instruction buffer 124 is empty, or nearly empty, when there is an instruction cache miss, instruction decode unit 130 is stalled, i.e., pipeline 300 is stalled. Specifically, instruction cache controller 121 generates a stall signal upon a cache miss which is used along with an instruction buffer empty signal to determine whether to stall pipeline 300. Instruction cache 125 can be invalidated to accommodate self-modifying code, e.g., instruction cache controller 121 can invalidate a particular line in instruction cache 125.

Thus, instruction cache controller 121 determines the next instruction to be fetched, i.e., which instruction in instruction cache 125 needs to accessed, and generates address, data and control signals for data and tag RAMs in instruction cache 125. On a cache hit, four bytes of data are fetched from instruction cache 125 in a single cycle, and a maximum of four bytes can be written into instruction buffer 124.

Byte aligner circuit 122 aligns the data out of the instruction cache RAM and feeds the aligned data to instruction buffer 124. As explained more completely below, the first two bytes in instruction buffer 124 are decoded to determine the length of the virtual machine instruction. Instruction buffer 124 tracks the valid instructions in the queue and updates the entries, as explained more completely below.

Instruction cache controller 121 also provides the data path and control for handling instruction cache misses. On an instruction cache miss, instruction cache controller 121 generates a cache fill request to I/O bus and memory interface unit 110.

On receiving data from external memory, instruction cache controller 121 writes the data into instruction cache 125 and the data are also bypassed into instruction buffer 124. Data are bypassed to instruction buffer 124 as soon as the data are available from external memory, and before the completion of the cache fill.

Instruction cache controller 121 continues fetching sequential data until instruction buffer 124 is full or a branch or trap has taken place. In one embodiment, instruction buffer 124 is considered full if there are more than eight bytes of valid entries in buffer 124. Thus, typically, eight bytes of data are written into instruction cache 125 from external memory in response to the cache fill request sent to interface unit 110 by instruction cache unit 120. If there is a branch or trap taken while processing an instruction cache miss, only after the completion of the miss processing is the trap or branch executed.

When an error is generated during an instruction cache fill transaction, a fault indication is generated and stored into instruction buffer 124 along with the virtual machine instruction, i.e., a fault bit is set. The line is not written into instruction cache 125. Thus, the erroneous cache fill transaction acts like a non-cacheable transaction except that a fault bit is set. When the instruction is decoded, a trap is taken.

Instruction cache controller 121 also services non-cacheable instruction reads. An instruction cache enable (ICE) bit, in a processor status register in register set 144, is used to define whether a load can be cached. If the instruction cache enable bit is cleared, instruction cache unit 120 treats all loads as non-cacheable loads. Instruction cache controller 121 issues a non-cacheable request to interface unit 110 for non-cacheable instructions. When the data are available on a cache fill bus for the non-cacheable instruction, the data are bypassed into instruction buffer 124 and are not written into instruction cache 125.

In this embodiment, instruction cache 125 is a direct-mapped, eight-byte-line size cache. Instruction cache 125 has a single cycle latency. The cache size is configurable to 0K, 1K, 2K, 4K, 8K and 16K byte sizes where K means kilo. The default size is 4K bytes. Each line has a cache tag entry associated with the line. Each cache tag contains a twenty bit address tag field and one valid bit for the default 4K byte size.

Instruction buffer 124, which, in an exemplary embodiment, is a twelve-byte deep first-in, first-out (FIFO) buffer, de-links fetch stage 301 (FIG. 3) from the rest of pipeline 300 for performance reasons. Each instruction in buffer 124 (FIG. 1) has an associated valid bit and an error bit. When the valid bit is set, the instruction associated with that valid bit is a valid instruction. When the error bit is set, the fetch of the instruction associated with that error bit was an erroneous transaction. Instruction buffer 124 includes an instruction buffer control circuit (not shown) that generates signals to pass data to and from instruction buffer 124 and that keeps track of the valid entries in instruction buffer 124, i.e., those with valid bits set.

In an exemplary embodiment, four bytes can be received into instruction buffer 124 in a given cycle. Up to five bytes, representing up to two virtual machine instructions, can be read out of instruction buffer 124 in a given cycle. Alternative embodiments, particularly those providing folding of multi-byte virtual machine instructions and/or those providing folding of more than two virtual machine instructions, provide higher input and output bandwidth. Persons of ordinary skill in the art will recognize a variety of suitable instruction buffer designs including, for example, alignment logic, circular buffer design, etc. When a branch or trap is taken, all the entries in instruction buffer 124 are nullified and the branch/trap data moves to the top of instruction buffer 124.

In the embodiment of FIG. 1, a unified execution unit 140 is shown. However, in another embodiment, instruction decode unit 130, integer unit 142, and stack management unit 150 are considered a single integer execution unit, and floating point execution unit 143 is a separate optional unit. In still other embodiments, the various elements in the execution unit may be implemented using the execution unit of another processor. In general, the various elements included in the various units of FIG. 1 are exemplary only of one embodiment. Each unit could be implemented with all or some of the elements shown. Again, the decision is largely dependent upon a price vs. performance trade-off.

Instruction Decode Unit

As explained above, virtual machine instructions are decoded in decode stage 302 (FIG. 3) of pipeline 300. In an exemplary embodiment, two bytes, that can correspond to two virtual machine instructions, are fetched from instruction buffer 124 (FIG. 1). The two bytes are decoded in parallel to determine if the two bytes correspond to two virtual machine instructions, e.g., a first load top of stack instruction and a second add top two stack entries instruction, that can be folded into a single equivalent operation. Folding refers to supplying a single equivalent operation corresponding to two or more virtual machine instructions.

In an exemplary hardware processor 100 embodiment, a single-byte first instruction can be folded with a second instruction. However, alternative embodiments provide folding of more than two virtual machine instructions, e.g., two to four virtual machine instructions, and of multi-byte virtual machine instructions, though at the cost of instruction decoder complexity and increased instruction bandwidth. See U.S. patent application Ser. No. 08/786,351, entitled "INSTRUCTION FOLDING FOR A STACK-BASED MACHINE" naming Marc Tremblay and James Michael O'Connor as inventors, assigned to the assignee of this application, and filed on even date herewith, now U.S. Pat. No. 6,026,485, which is incorporated herein by reference in its entirety. In the exemplary processor 100 embodiment, if the first byte, which corresponds to the first virtual machine instruction, is a multi-byte instruction, the first and second instructions are not folded.

An optional current object loader folder 132 exploits instruction folding, such as that described above, and in greater detail in U.S. patent application Ser. No. 08/786,351, entitled "INSTRUCTION FOLDING FOR A STACK-BASED MACHINE" naming Marc Tremblay and James Michael O'Connor as inventors, assigned to the assignee of this application, and filed on even date herewith, now U.S. Pat. No. 6,026,485, which is incorporated herein by reference in its entirety, in virtual machine instruction sequences which simulation results have shown to be particularly frequent and therefore a desirable target for optimization. In particular, a method invocation typically loads an object reference for the corresponding object onto the operand stack and fetches a field from the object. Instruction folding allows this extremely common virtual machine instruction sequence to be executed using an equivalent folded operation.

Quick variants are not part of the virtual machine instruction set (See Chapter 3 of Appendix I), and are invisible outside of a JAVA virtual machine implementation. However, inside a virtual machine implementation, quick variants have proven to be an effective optimization. (See Appendix A in Appendix I; which is an integral part of this specification.) Supporting writes for updates of various instructions to quick variants in a non-quick to quick translator cache 131 changes the normal virtual machine instruction to a quick virtual machine instruction to take advantage of the large benefits bought from the quick variants. In particular, as described in more detail in U.S. patent application Ser. No. 08/788,805, entitled "NON-QUICK INSTRUCTION ACCELERATOR INCLUDING INSTRUCTION IDENTIFIER AND DATA SET STORAGE AND METHOD OF IMPLEMENTING SAME" naming Marc Tremblay and James Michael O'Connor as inventors, assigned to the assignee of this application, and filed on even date herewith, now U.S. Pat. No. 6,065,108, which is incorporated herein by reference in its entirety, when the information required to initiate execution of an instruction has been assembled for the first time, the information is stored in a cache along with the value of program counter PC as a tag in non-quick to quick translator cache 131 and the instruction is identified as a quick-variant. In one embodiment, this is done with self-modifying code.

Upon a subsequent call of that instruction, instruction decode unit 130 detects that the instruction is identified as a quick-variant and simply retrieves the information needed to initiate execution of the instruction from non-quick to quick translator cache 131. Non-quick to quick translator cache is an optional feature of hardware processor 100.

With regard to branching, a very short pipe with quick branch resolution is sufficient for most implementations. However, an appropriate simple branch prediction mechanism can alternatively be introduced, e.g., branch predictor circuit 133. Implementations for branch predictor circuit 133 include branching based on opcode, branching based on offset, or branching based on a two-bit counter mechanism.

The JAVA virtual machine specification defines an instruction invokenonvirtual, opcode 183, which, upon execution, invokes methods. The opcode is followed by an index byte one and an index byte two. (See Appendix I.) Operand stack 423 contains a reference to an object and some number of arguments when this instruction is executed.

Index bytes one and two are used to generate an index into the constant pool of the current class. The item in the constant pool at that index points to a complete method signature and class. Signatures are defined in Appendix I and that description is incorporated herein by reference.

The method signature, a short, unique identifier for each method, is looked up in a method table of the class indicated. The result of the lookup is a method block that indicates the type of method and the number of arguments for the method. The object reference and arguments are popped off this method's stack and become initial values of the local variables of the new method. The execution then resumes with the first instruction of the new method. Upon execution, instructions invokevirtual, opcode 182, and invokestatic, opcode 184, invoke processes similar to that just described. In each case, a pointer is used to lookup a method block.

A method argument cache 134, that also is an optional feature of hardware processor 100, is used, in a first embodiment, to store the method block of a method for use after the first call to the method, along with the pointer to the method block as a tag. Instruction decode unit 130 uses index bytes one and two to generate the pointer and then uses the pointer to retrieve the method block for that pointer in cache 134. This permits building the stack frame for the newly invoked method more rapidly in the background in subsequent invocations of the method. Alternative embodiments may use a program counter or method identifier as a reference into cache 134. If there is a cache miss, the instruction is executed in the normal fashion and cache 134 is updated accordingly. The particular process used to determine which cache entry is overwritten is not an essential aspect of this invention. A least-recently used criterion could be implemented, for example.

In an alternative embodiment, method argument cache 134 is used to store the pointer to the method block, for use after the first call to the method, along with the value of program counter PC of the method as a tag. Instruction decode unit 130 uses the value of program counter PC to access cache 134. If the value of program counter PC is equal to one of the tags in cache 134, cache 134 supplies the pointer stored with that tag to instruction decode unit 130. Instruction decode unit 130 uses the supplied pointer to retrieve the method block for the method. In view of these two embodiments, other alternative embodiments will be apparent to those of skill in the art.

Wide index forwarder 136, which is an optional element of hardware processor 100, is a specific embodiment of instruction folding for instruction wide. Wide index forwarder 136 handles an opcode encoding an extension of an index operand for an immediately subsequent virtual machine instruction. In this way, wide index forwarder 136 allows instruction decode unit 130 to provide indices into local variable storage 421 when the number of local variables exceeds that addressable with a single byte index without incurring a separate execution cycle for instruction wide.

Aspects of instruction decoder 135, particularly instruction folding, non-quick to quick translator cache 131, current object loader folder 132, branch predictor 133, method argument cache 134, and wide index forwarder 136 are also useful in implementations that utilize a software interpreter or just-in-time compiler, since these elements can be used to accelerate the operation of the software interpreter or just-in-time compiler. In such an implementation typically, the virtual machine instructions are translated to an instruction for the processor executing the interpreter or compiler, e.g., any one of a Sun processor, a DEC processor, an Intel processor, or a Motorola processor, for example, and the operation of the elements is modified to support execution on that processor. The translation from the virtual machine instruction to the other processor instruction can be done either with a translator in a ROM or a simple software translator. For additional examples of dual instruction set processors, see U.S. patent application Ser. No. 08/787,618, entitled "A PROCESSOR FOR EXECUTING INSTRUCTION SETS RECEIVED FROM A NETWORK OR FROM A LOCAL MEMORY" naming Marc Tremblay and James Michael O'Connor as inventors, assigned to the assignee of this application, and filed on even date herewith, now U.S. Pat. No. 5,925,123, which is incorporated herein by reference in its entirety.

Integer Execution Unit

Integer execution unit IEU, that includes instruction decode unit 130, integer unit 142, and stack management unit 150, is responsible for the execution of all the virtual machine instructions except the floating point related instructions. The floating point related instructions are executed in floating point unit 143.

Integer execution unit IEU interacts at the front end with instructions cache unit 120 to fetch instructions, with floating point unit (FPU) 143 to execute floating point instructions, and finally with data cache unit (DCU) 160 to execute load and store related instructions. Integer execution unit IEU also contains microcode ROM 141, which contains instructions to execute certain virtual machine instructions associated with integer operations.

Integer execution unit IEU includes a cached portion of stack 400, i.e., stack cache 155. Stack cache 155 provides fast storage for operand stack and local variable entries associated with a current method, e.g., operand stack 423 and local variable storage 421 entries. Although, stack cache 155 may provide sufficient storage for all operand stack and local variable entries associated with a current method, depending on the number of operand stack and local variable entries, less than all of local variable entries or less than all of both local variable entries and operand stack entries may be represented in stack cache 155. Similarly, additional entries, e.g., operand stack and or local variable entries for a calling method, may be represented in stack cache 155 if space allows.

Stack cache 155 is a sixty-four entry thirty-two-bit wide array of registers that is physically implemented as a register file in one embodiment. Stack cache 155 has three read ports, two of which are dedicated to integer execution unit IEU and one to dribble manager unit 151. Stack cache 155 also has two write ports, one dedicated to integer execution unit IEU and one to dribble manager unit 151.

Integer unit 142 maintains the various pointers, which are used to access variables, such as local variables and operand stack values, in stack cache 155. Integer unit 142 also maintains pointers to detect whether a stack cache hit has taken place. Runtime exceptions are caught and dealt with by exception handlers that are implemented using information in microcode ROM 141 and circuit 170.

Integer unit 142 contains a 32-bit ALU to support arithmetic operations. The operations supported by the ALU include: add, subtract, shift, and, or, exclusive or, compare, greater than, less than, and bypass. The ALU is also used to determine the address of conditional branches while a separate comparator determines the outcome of the branch instruction.

The most common set of instructions which executes cleanly through the pipeline is the group of ALU instructions. The ALU instructions read the operands from the top of stack 400 in decode stage 302 and use the ALU in execution stage 303 to compute the result. The result is written back to stack 400 in write-back stage 305. There are two levels of bypass which may be needed if consecutive ALU operations are accessing stack cache 155.

Since the stack cache ports are 32-bits wide in this embodiment, double precision and long data operations take two cycles. A shifter is also present as part of the ALU. If the operands are not available for the instruction in decode stage 302, or at a maximum at the beginning of execution stage 303, an interlock holds the pipeline stages before execution stage 303.

The instruction cache unit interface of integer execution unit IEU is a valid/accept interface, where instruction cache unit 120 delivers instructions to instruction decode unit 130 in fixed fields along with valid bits. Instruction decoder 135 responds by signaling how much byte aligner circuit 122 needs to shift, or how many bytes instruction decode unit 130 could consume in decode stage 302. The instruction cache unit interface also signals to instruction cache unit 120 the branch mis-predict condition, and the branch address in execution stage 303. Traps, when taken, are also similarly indicated to instruction cache unit 120. Instruction cache unit 120 can hold integer unit 142 by not asserting any of the valid bits to instruction decode unit 130. Instruction decode unit 130 can hold instruction cache unit 120 by not asserting the shift signal to byte aligner circuit 122.

The data cache interface of integer execution unit IEU also is a valid-accept interface, where integer unit 142 signals, in execution stage 303, a load or store operation along with its attributes, e.g., non-cached, special stores etc., to data cache controller 161 in data cache unit 160. Data cache unit 160 can return the data on a load, and control integer unit 142 using a data control unit hold signal. On a data cache hit, data cache unit 160 returns the requested data, and then releases the pipeline.

On store operations, integer unit 142 also supplies the data along with the address in execution stage 303. Data cache unit 160 can hold the pipeline in cache stage 304 if data cache unit 160 is busy, e.g., doing a line fill etc.

Floating point operations are dealt with specially by integer execution unit IEU. Instruction decoder 135 fetches and decodes floating point unit 143 related instructions. Instruction decoder 135 sends the floating point operation operands for execution to floating point unit 142 in decode state 302. While floating point unit 143 is busy executing the floating point operation, integer unit 142 halts the pipeline and waits until floating point unit 143 signals to integer unit 142 that the result is available.

A floating point ready signal from floating point unit 143 indicates that execution stage 303 of the floating point operation has concluded. In response to the floating point ready signal, the result is written back into stack cache 155 by integer unit 142. Floating point load and stores are entirely handled by integer execution unit IEU, since the operands for both floating point unit 143 and integer unit 142 are found in stack cache 155.

Stack Management Unit

A stack management unit 150 stores information, and provides operands to execution unit 140. Stack management unit 150 also takes care of overflow and underflow conditions of stack cache 155.

In one embodiment, stack management unit 150 includes stack cache 155 that, as described above, is a three read port, two write port register file in one embodiment; a stack control unit 152 which provides the necessary control signals for two read ports and one write port that are used to retrieve operands for execution unit 140 and for storing data back from a write-back register or data cache 165 into stack cache 155; and a dribble manager 151 which speculatively dribbles data in and out of stack cache 155 into memory whenever there is an overflow or underflow in stack cache 155. In the exemplary embodiment of FIG. 1, memory includes data cache 165 and any memory storage interfaced by memory interface unit 110. In general, memory includes any suitable memory hierarchy including caches, addressable read/write memory storage, secondary storage, etc. Dribble manager 151 also provides the necessary control signals for a single read port and a single write port of stack cache 155 which are used exclusively for background dribbling purposes.

In one embodiment, stack cache 155 is managed as a circular buffer which ensures that the stack grows and shrinks in a predictable manner to avoid overflows or overwrites. The saving and restoring of values to and from data cache 165 is controlled by dribbler manager 151 using high- and low-water marks, in one embodiment.

Stack management unit 150 provides execution unit 140 with two 32-bit operands in a given cycle. Stack management unit 150 can store a single 32-bit result in a given cycle.

Dribble manager 151 handles spills and fills of stack cache 155 by speculatively dribbling the data in and out of stack cache 155 from and to data cache 165. Dribble manager 151 generates a pipeline stall signal to stall the pipeline when a stack overflow or underflow condition is detected. Dribble manager 151 also keeps track of requests sent to data cache unit 160. A single request to data cache unit 160 is a 32-bit consecutive load or store request.

The hardware organization of stack cache 155 is such that, except for long operands (long integers and double precision floating-point numbers), implicit operand fetches for opcodes do not add latency to the execution of the opcodes. The number of entries in operand stack 423 (FIG. 4A) and local variable storage 421 that are maintained in stack cache 155 represents a hardware/performance tradeoff. At least a few operand stack 423 and local variable storage 421 entries are required to get good performance. In the exemplary embodiment of FIG. 1, at least the top three entries of operand stack 423 and the first four local variable storage 421 entries are preferably represented in stack cache 155.

One key function provided by stack cache 155 (FIG. 1) is to emulate a register file where access to the top two registers is always possible without extra codes. A small hardware stack is sufficient if the proper intelligence is provided to load/store values from/to memory in the background, therefore preparing stack cache 155 for incoming virtual machine instructions.

As indicated above, all items on stack 400 (regardless of size) are placed into a 32-bit word. This tends to waste space if many small data items are used, but it also keeps things relatively simple and free of lots of tagging or muxing. An entry in stack 400 thus represents a value and not a number of bytes. Long integer and double precision floating-point numbers require two entries. To keep the number of read and write ports low, two cycles to read two long integers or two double precision floating point numbers are required.

The mechanism for filling and spilling the operand stack from stack cache 155 out to memory by dribble manager 151 can assume one of several alternative forms. One register at a time can be filled or spilled, or a block of several registers filled or spilled at once. A simple scoreboarded method is appropriate for stack management. In its simplest form, a single bit indicates if the register in stack cache 155 is currently valid. In addition, some embodiments of stack cache 155 use a single bit to indicate whether the data content of the register is saved to stack 400, i.e., whether the register is dirty. In one embodiment, a high-water mark/low-water mark heuristic determines when entries are saved to and restored from stack 400, respectively (FIG. 4A) Alternatively, when the top-of-the-stack becomes close to bottom 401 of stack cache 155 by a fixed, or alternatively, a programmable number of entries, the hardware starts loading registers from stack 400 into stack cache 155. Detailed embodiments of stack management unit 150 and dribble manager unit 151 are described below and in U.S. patent application Ser. No. 08/787,736, entitled "STACK MANAGEMENT UNIT AND METHOD FOR A PROCESSOR HAVING A STACK" naming Mark Tremblay and James Michael O'Connor as inventors, assigned to the assignee of this application, and filed on even date herewith, now U.S. Pat. No. 6,038,643, which is incorporated herein by reference in its entirety.

In one embodiment, stack management unit 150 also includes an optional local variable look-aside cache 153. Cache 153 is most important in applications where both the local variables and operand stack 423 (FIG. 4A) for a method are not located on stack cache 155. In such instances when cache 153 is not included in hardware processor 100, there is a miss on stack cache 155 when a local variable is accessed, and execution unit 140 accesses data cache unit 160, which in turn slows down execution. In contrast, with cache 153, the local variable is retrieved from cache 153 and there is no delay in execution.

Figure 4D:
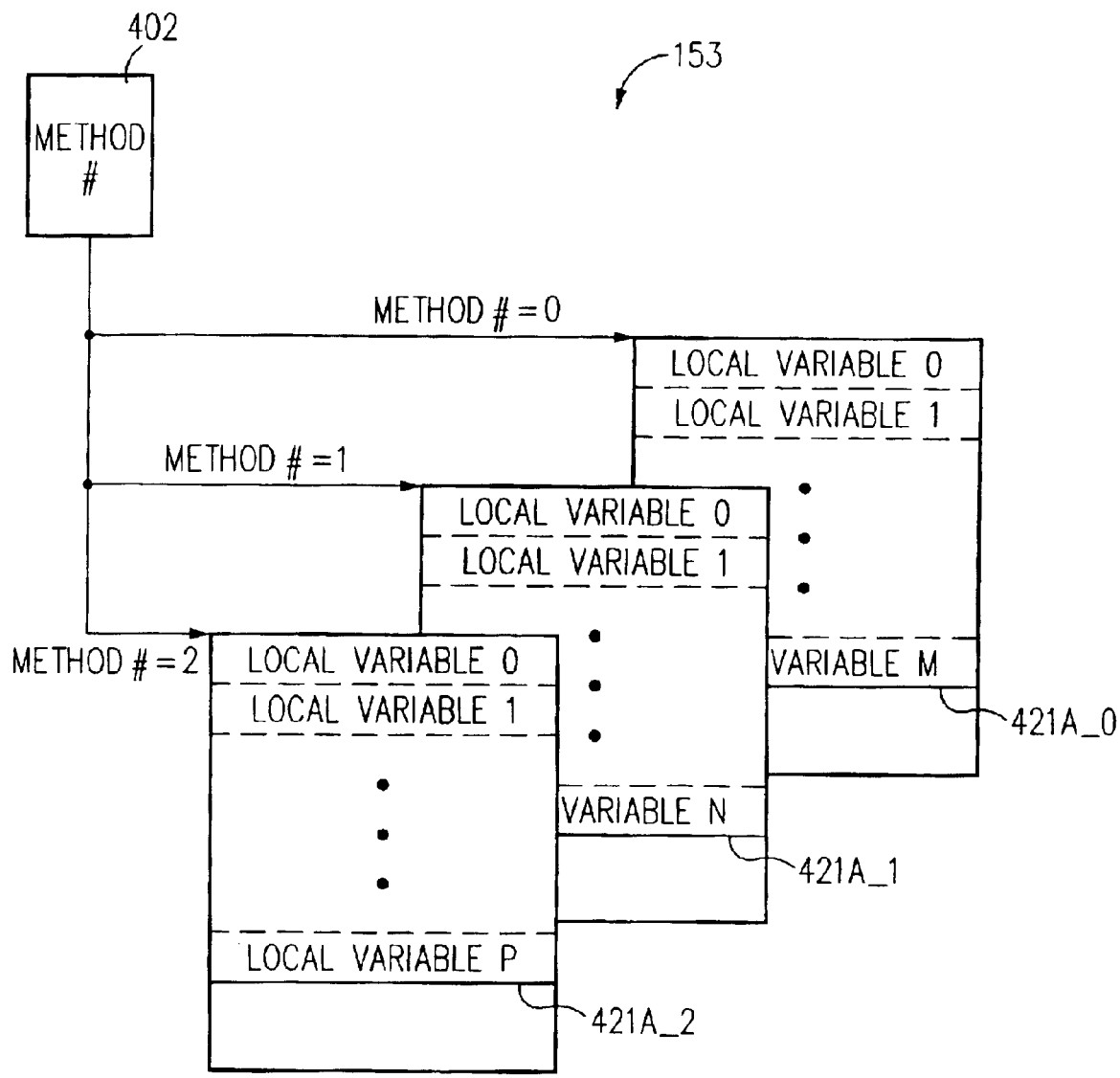
FIG. 4D is an illustration of one embodiment of the local variables look-aside cache in the stack management unit of FIG. 1.

One embodiment of local variable look-aside cache 153 is illustrated in FIG. 4D for methods 0 to 2 on stack 400. Local variables zero to M, where M is an integer, for method 0 are stored in plane 421A_0 of cache 153 and plant 421A_0 is accessed when method number 402 is zero. Local variables zero to N, where N is an integer, for method 1 are stored in plane 421A_1 of cache 153 and plane 421A_1 is accessed when method number 402 is one. Local variables zero to P, where P is an integer, for method 2 are stored in plane 421A_2 of cache 153 and plane 421A_2 is accessed when method number 402 is two. Notice that the various planes of cache 153 may be different sizes, but typically each plane of the cache has a fixed size that is empirically determined.

When a new method is invoked, e.g., method 2, a new plane 421A_2 in cache 153 is loaded with the local variables for that method, and method number register 402, which in one embodiment is a counter, is changed, e.g., incremented, to point to the plane of cache 153 containing the local variables for the new method. Notice that the local variables are ordered within a plane of cache 153 so that cache 153 is effectively a direct-mapped cache. Thus, when a local variable is needed for the current method, the variable is accessed directly from the most recent plane in cache 153, i.e., the plane identified by method number 402. When the current method returns, e.g., method 2, method number register 402 is changed, e.g., decremented, to point at previous plane 421_1 of cache 153. Cache 153 can be made as wide and as deep as necessary.

Data Cache Unit

Data cache unit 160 (DCU) manages all requests for data in data cache 165. Data cache requests can come from dribbling manager 151 or execution unit 140. Data cache controller 161 arbitrates between these requests giving priority to the execution unit requests. In response to a request, data cache controller 161 generates address, data and control signals for the data and tags RAMs in data cache 165. For a data cache hit, data cache controller 161 reorders the data RAM output to provide the right data.

Data cache controller 161 also generates requests to I/O bus and memory interface unit 110 in case of data cache misses, and in case of non-cacheable loads and stores. Data cache controller 161 provides the data path and control logic for processing non-cacheable requests, and the data path and data path control functions for handling cache misses.

For data cache hits, data cache unit 160 returns data to execution unit 140 in one cycle for loads. Data cache unit 160 also takes one cycle for write hits. In case of a cache miss, data cache unit 160 stalls the pipeline until the requested data is available from the external memory. For both non-cacheable loads and stores, data cache 165 is bypassed and requests are sent to I/O bus and memory interface unit 110. Non-aligned loads and stores to data cache 165 trap in software.

Data cache 165 is a two-way set associative, write back, write allocate, 16-byte line cache. The cache size is configurable to 0, 1, 2, 4, 8, 16 Kbyte sizes. The default size is 8 Kbytes. Each line has a cache tag store entry associated with the line. On a cache miss, 16 bytes of data are written into cache 165 from external memory.

Each data cache tag contains a 20-bit address tag field, one valid bit, and one dirty bit. Each cache tag is also associated with a least recently used bit that is used for replacement policy. To support multiple cache sizes, the width of the tag fields also can be varied. If a cache enable bit in processor service register is not set, loads and stores are treated like non-cacheable instructions by data cache controller 161.

A single sixteen-byte write back buffer is provided for writing back dirty cache lines, which need to be replaced. Data cache unit 160 can provide a maximum of four bytes on a read and a maximum of four bytes of data can be written into cache 165 in a single cycle. Diagnostic reads and writes can be done on the caches.

Memory Allocation Accelerator

In one embodiment, data cache unit 160 includes a memory allocation accelerator 166. Typically, when a new object is created, fields for the object are fetched from external memory, stored in data cache 165 and then the field is cleared to zero. This is a time consuming process that is eliminated by memory allocation accelerator 166. When a new object is created, no fields are retrieved from external memory. Rather, memory allocation accelerator 166 simply stores a line of zeros in data cache 165 and marks that line of data cache 165 as dirty. Memory allocation accelerator 166 is particularly advantageous with a write-back cache. Since memory allocation accelerator 166 eliminates the external memory access each time a new object is created, the performance of hardware processor 100 is enhanced.

Floating Point Unit

Floating point unit (FPU) 143 includes a microcode sequencer, input/output section with input/output registers, a floating point adder, i.e., an ALU, and a floating point multiply/divide unit. The microcode sequencer controls the microcode flow and microcode branches. The input/output section provides the control for input/output data transactions, and provides the input data loading and output data unloading registers. These registers also provide intermediate result storage.

The floating point adder-ALU includes the combinatorial logic used to perform the floating point adds, floating point subtracts, and conversion operations. The floating point multiply/divide unit contains the hardware for performing multiply/divide and remainder.

Floating point unit 143 is organized as a microcoded engine with a 32-bit data path. This data path is often reused many times during the computation of the result. Double precision operations require approximately two to four times the number of cycles as single precision operations. The floating point ready signal is asserted one-cycle prior to the completion of a given floating point operation. This allows integer unit 142 to read the floating point unit output registers without any wasted interface cycles. Thus, output data is available for reading one cycle after the floating point ready signal is asserted.

Execution Unit Accelerators

Since the JAVA Virtual Machine Specification of Appendix I is hardware independent, the virtual machine instructions are not optimized for a particular general type of processor, e.g., a complex instruction set computer (CISC) processor, or a reduced instruction set computer (RISC) processor. In fact, some virtual machine instructions have a CISC nature and others a RISC nature. This dual nature complicates the operation and optimization of hardware processor 100.

For example, the JAVA virtual machine specification defines opcode 171 for an instruction lookupswitch, which is a traditional switch statement. The datastream to instruction cache unit 120 includes an opcode 171, identifying the N-way switch statement, that is followed zero to three bytes of padding. The number of bytes of padding is selected so that first operand byte begins at an address that is a multiple of four. Herein, datastream is used generically to indicate information that is provided to a particular element, block, component, or unit.

Following the padding bytes in the datastream are a series of pairs of signed four-byte quantities. The first pair is special. A first operand in the first pair is the default offset for the switch statement that is used when the argument, referred to as an integer key, or alternatively, a current match value, of the switch statement is not equal to any of the values of the matches in the switch statement. The second operand in the first pair defines the number of pairs that follow in the datastream.

Each subsequent operand pair in the datastream has a first operand that is a match value, and a second operand that is an offset. If the integer key is equal to one of the match values, the offset in the pair is added to the address of the switch statement to define the address to which execution branches. Conversely, if the integer key is unequal to any of the match values, the default offset in the first pair is added to the address of the switch statement to define the address to which execution branches. Direct execution of this virtual machine instruction requires many cycles.

To enhance the performance of hardware processor 100, a look-up switch accelerator 145 is included in hardware processor 100. Look-up switch accelerator 145 includes an associative memory which stores information associated with one or more lookup switch statements. For each lookup switch statement, i.e., each instruction lookupswitch, this information includes a lookup switch identifier value, i.e., the program counter value associated with the lookup switch statement, a plurality of match values and a corresponding plurality of jump offset values.

Lookup switch accelerator 145 determines whether a current instruction received by hardware processor 100 corresponds to a lookup switch statement stored in the associative memory. Lookup switch accelerator 145 further determines whether a current match value associated with the current instruction corresponds with one of the match values stored in the associative memory. Lookup switch accelerator 145 accesses a jump offset value from the associative memory when the current instruction corresponds to a lookup switch statement stored in the memory and the current match value corresponds with one of the match values stored in the memory wherein the accessed jump offset value corresponds with the current match value.

Lookup switch accelerator 145 further includes circuitry for retrieving match and jump offset values associated with a current lookup switch statement when the associative memory does not already contain the match and jump offset values associated with the current lookup switch statement. Lookup switch accelerator 145 is described in more detail in U.S. patent application Ser. No. 08/788,811, entitled "LOOK-UP SWITCH ACCELERATOR AND METHOD OF OPERATING SAME" naming Marc Tremblay and James Michael O'Connor as inventors, assigned to the assignee of this application, and filed on even date herewith, now U.S. Pat. No. 6,076,141, which is incorporated herein by reference in its entirety.

In the process of initiating execution of a method of an object, execution unit 140 accesses a method vector to retrieve one of the method pointers in the method vector, i.e., one level of indirection. Execution unit 140 then uses the accessed method pointer to access a corresponding method, i.e., a second level of indirection.

To reduce the levels of indirection within execution unit 140, each object is provided with a dedicated copy of each of the methods to be accessed by the object. Execution unit 140 then accesses the methods using a single level of indirection. That is, each method is directly accessed by a pointer, which is derived from the object. This eliminates a level of indirection, which was previously introduced by the method pointers. By reducing the levels of indirection, the operation of execution unit 140 can be accelerated. The acceleration of execution unit 140 by reducing the levels of indirection experienced by execution unit 140 is described in more detail in U.S. patent application Ser. No. 08/787,846, entitled "REPLICATING CODE TO ELIMINATE A LEVEL OF INDIRECTION DURING EXECUTION OF AN OBJECT ORIENTED COMPUTER PROGRAM" naming Marc Tremblay and James Michael O'Connor as inventors, assigned to the assignee of this application, and filed on even date herewith, now U.S. Pat. No. 5,970,242, which is incorporated herein by reference in its entirety.

Getfield-putfield Accelerator

Other specific functional units and various translation lookaside buffer (TLB) types of structures may optionally be included in hardware processor 100 to accelerate accesses to the constant pool. For example, the JAVA virtual machine specification defines an instruction putfield, opcode 181, that upon execution sets a field in an object and an instruction getfield, opcode 180, that upon execution fetches a field from an object. In both of these instructions, the opcode is followed by an index byte one and an index byte two. Operand stack 423 contains a reference to an object followed by a value for instruction putfield, but only a reference to an object for instruction getfield.

Index bytes one and two are used to generate an index into the constant pool of the current class. The item in the constant pool at that index is a field reference to a class name and a field name. The item is resolved to a field block pointer which has both the field width, in bytes, and the field offset, in bytes.

An optional getfield-putfield accelerator 146 in execution unit 140 stores the field block pointer for instruction getfield or instruction putfield in a cache, for use after the first invocation of the instruction, along with the index used to identify the item in the constant pool that was resolved into the field block pointer as a tag. Subsequently, execution unit 140 uses index bytes one and two to generate the index and supplies the index to getfield-putfield accelerator 146. If the index matches one of the indexes stored as a tag, i.e., there is a hit, the field block pointer associated with that tag is retrieved and used by execution unit 140. Conversely, if a match is not found, execution unit 140 performs the operations described above. Getfield-putfield accelerator 146 is implemented without using self-modifying code that was used in one embodiment of the quick instruction translation described above.

In one embodiment, getfield-putfield accelerator 146 includes an associative memory that has a first section that holds the indices that function as tags, and a second section that holds the field block pointers. When an index is applied through an input section to the first section of the associative memory, and there is a match with one of the stored indices, the field block pointer associated with the stored index that matched in input index is output from the second section of the associative memory.

Bounds Check Unit

Bounds check unit 147 (FIG. 1) in execution unit 140 is an optional hardware circuit that checks each access to an element of an array to determine whether the access is to a location within the array. When the access is to a location outside the array, bounds check unit 147 issues an active array bound exception signal to execution unit 140. In response to the active array bound exception signal, execution unit 140 initiates execution of an exception handler stored in microcode ROM 141 that in handles the out of bounds array access.

In one embodiment, bounds check unit 147 includes an associative memory element in which is store an array identifier for an array, e.g., a program counter value, and a maximum value and a minimum value for the array. When an array is accessed, i.e., the array identifier for that array is applied to the associative memory element, and assuming the array is represented in the associative memory element, the stored minimum value is a first input signal to a first comparator element, sometimes called a comparison element, and the stored maximum value is a first input signal to a second comparator element, sometimes also called a comparison element. A second input signal to the first and second comparator elements is the value associated with the access of the array's element.

If the value associated with the access of the array's element is less than or equal to the stored maximum value and greater than or equal to the stored minimum value, neither comparator element generates an output signal. However, if either of these conditions is false, the appropriate comparator element generates the active array bound exception signal. A more detailed description of one embodiment of bounds check unit 147 is provided in U.S. patent application Ser. No. 08/786,352, entitled "PROCESSOR WITH ACCELERATED ARRAY ACCESS BOUNDS CHECKING" naming Marc Tremblay, James Michael O'Connor, and William N. Joy as inventors, assigned to the assignee of this application, and filed on even date herewith, now U.S. Pat. No. 6,014,723, which is incorporated herein by reference in its entirety.

The JAVA Virtual Machine Specification defines that certain instructions can cause certain exceptions. The checks for these exception conditions are implemented, and a hardware/software mechanism for dealing with them is provided in hardware processor 100 by information in microcode ROM 141 and program counter and trap control logic 170. The alternatives include having a trap vector style or a single trap target and pushing the trap type on the stack so that the dedicated trap handler routine determines the appropriate action.

No external cache is required for the architecture of hardware processor 100. No translation lookaside buffers need be supported.

Figure 5:
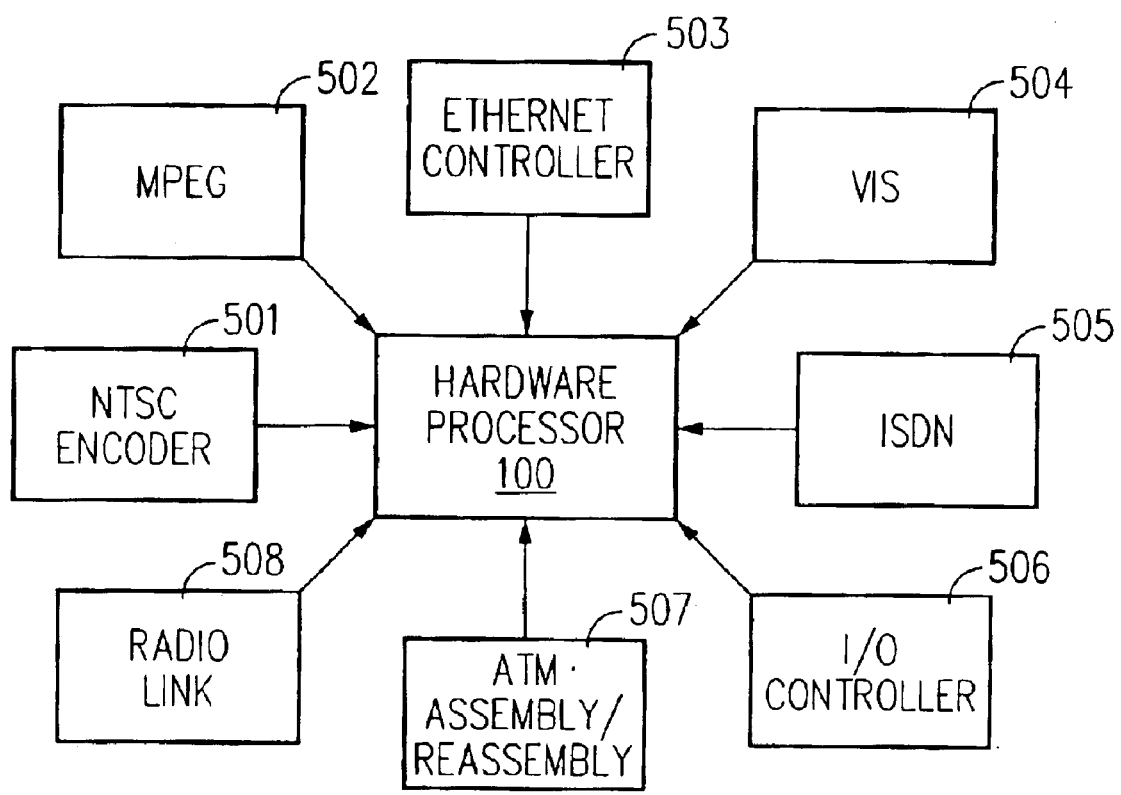
FIG. 5 illustrates several possible add-ons to the hardware processor of FIG. 1.

FIG. 5 illustrates several possible add-ons to hardware processor 100 to create a unique system. Circuits supporting any of the eight functions shown, i.e., NTSC encoder 501, MPEG 502, Ethernet controller 503, VIS 504, ISDN 505, I/O controller 506, ATM assembly/reassembly 507, and radio link 508 can be integrated into the same chip as hardware processor 100 of this invention.

Figure 6:
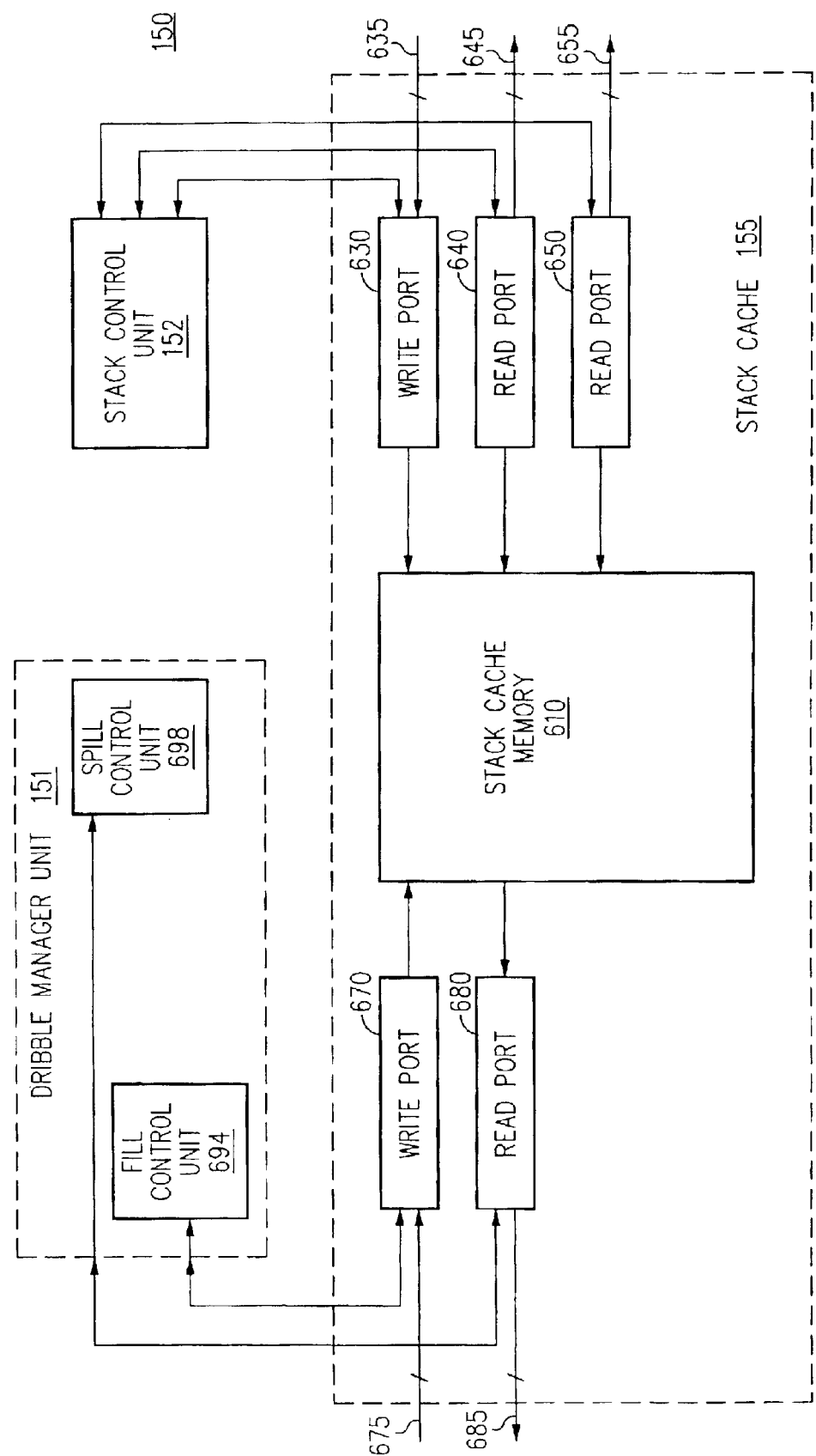
FIG. 6 illustrates a block diagram of one embodiment of a stack cache management unit in accordance with this invention.

FIG. 6 is a block diagram of one embodiment of a stack management unit 150. Stack management unit 150 serves as a high speed buffer between stack 400 and hardware processor 100. Hardware processor 100 accesses stack management unit 150 as if stack management unit 150 were stack 400. Stack management unit 150 automatically transfers data between stack management unit 150 and stack 400 as necessary to improve the throughput of data between stack 400 and hardware processor 100. In the embodiment of FIG. 1, if hardware processor 100 requires a data word which is not cached in stack management unit 150, data cache unit 160 retrieves the requested data word and places the requested data word at the top of stack cache 155.

Stack management unit 150 contains a stack cache memory circuit 610. Stack cache memory circuit 610 is typically fast memory devices such as a register file or SRAM; however, slower memory devices such as DRAM can also be used. In the embodiment of FIG. 6, access to stack cache memory circuit 610 is controlled by stack control unit 152. A write port 630 allows hardware processor 100 to write data on data lines 635 to stack cache memory circuit 610. Read port 640 and read port 650 allow hardware processor 100 to read data from stack cache memory circuit 610 on data lines 645 and 655, respectively. Two read ports are provided to increase throughput since many operations of stack-based computing systems require two operands from stack 400. Other embodiments of stack cache 155 may provide more or less read and write ports.

As explained above, dribble manager unit 151 controls the transfer of data between stack 400 (FIG. 4A) and stack cache memory circuit 610. In the embodiment shown in FIG. 1, the transfer of data between stack 400 and stack cache memory circuit 610 goes through data cache unit 160 Dribble manager unit 151 includes a fill control unit 694 and a spill control unit 698. In some embodiments of dribble manager unit 151, fill control unit 694 and spill control unit 698 function independently. Fill control unit 694 determines if a fill condition exists. If the fill condition exists, fill control unit 694 transfers data words from stack 400 to stack cache memory circuit 610 on data lines 675 through a write port 670. Spill control unit 698 determines if a spill condition exists. If the spill condition exists, spill control unit 698 transfers data words from stack cache memory circuit 610 to stack 400 through read port 680 on data lines 685. Write port 670 and read port 680 allows transfers between stack 400 and stack cache memory circuit 610 to occur simultaneously with reads and writes controlled by stack control unit 152. If contention for read and write ports of stack cache memory circuit 610 is not important, dribble manage unit 151 can share read and write ports with stack control unit 152.

Although stack management unit 150 is described in the context of buffering stack 400 for hardware processor 100, stack management unit 150 can perform caching for any stack-based computing system. The details of hardware processor 100, are provided only as an example of one possible stack-based computing system for use with the present invention. Thus, one skilled in the art can use the principles described herein to design a stack management unit in accordance to the present invention for any stack-based computing system.

Figure 7:
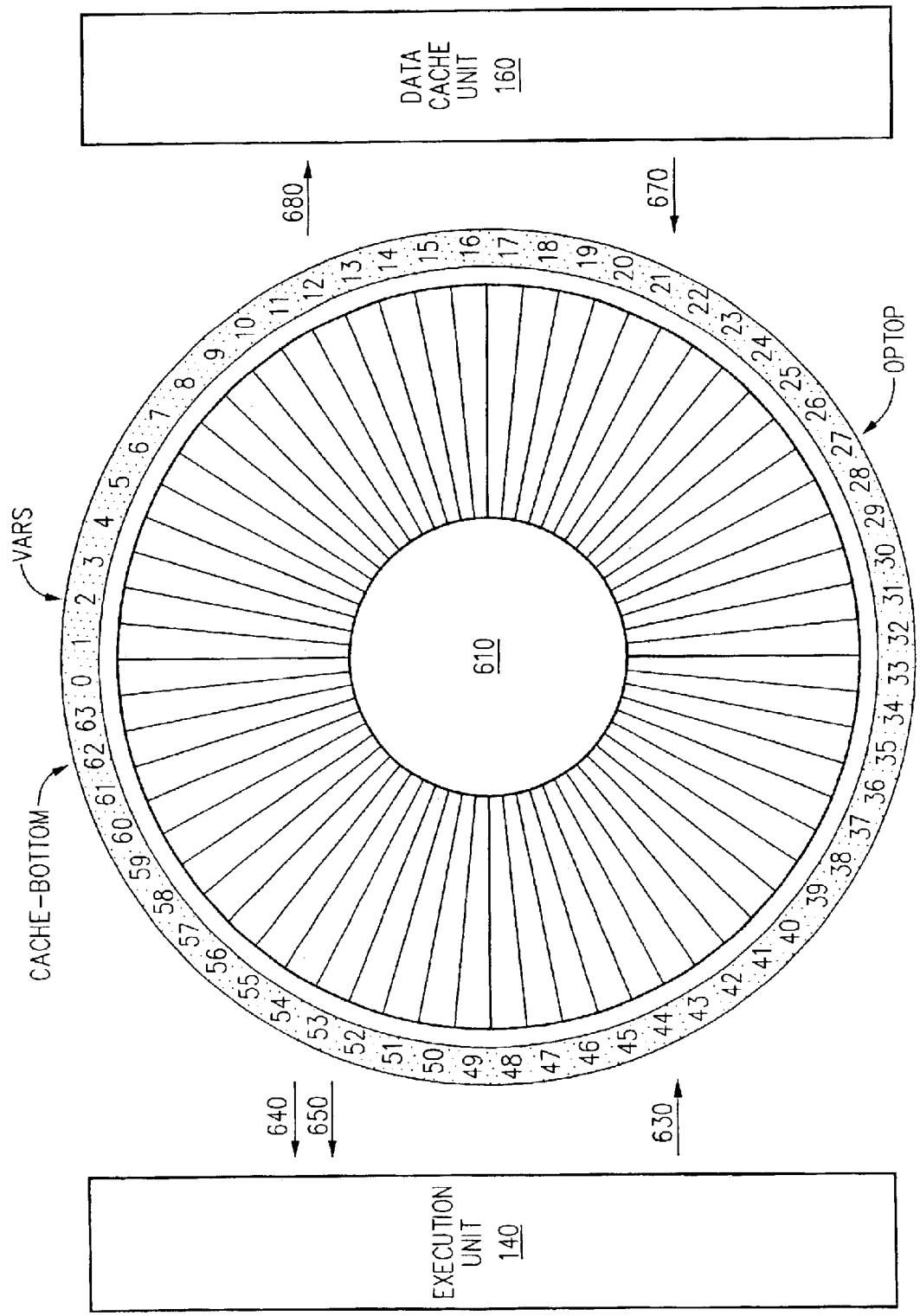
FIG. 7 illustrates the memory architecture of one embodiment of a stack cache in accordance with this invention.

FIG. 7 shows a conceptual model of the memory architecture of stack cache memory circuit 610 for one embodiment of stack cache 155. Specifically, in the embodiment of FIG. 7, stack cache memory circuit 610 is a register file organized in a circular buffer memory architecture capable of holding 64 data words. Other embodiments may contain a different number of data words. The circular memory architecture causes data words in excess of the capacity of stack cache memory circuit 610 to be written to previously used registers. If stack cache memory unit 610 uses a different memory device, such as an SRAM, different registers would correspond to different memory locations. One technique to address registers in a circular buffer is to use pointers containing modulo stack cache size (modulo-SCS) addresses to the various registers of stack cache memory circuit 610. As used herein, modulo-N operations have the results of the standard operation mapped to a number between 0 and SCS-1 using a standard MOD N function. Some common modulo operations are defined as follows Modulo-N addition of X and Y=(X+Y) MOD N,
Modulo-N subtraction of X and Y=(X−Y) MOD N,
Modulo-N increment of X by Y=(X+Y) MOD N,
Modulo-N decrement of X by Y=(X−Y) MOD N.

One embodiment of the pointer addresses of the registers of stack cache memory circuit 610 are shown in FIG. 7 as numbered 0–63 along the outer edge of stack cache memory circuit 610. Thus for the embodiment of FIG. 7, if 70 data words (numbered 1 to 70) are written to stack cache memory circuit 610 when stack cache memory circuit 610 is empty, data words 1 to 64 are written to registers 0 to 63, respectively and data words 65 to 70 are written subsequently to registers 0 to 5. Prior to writing data words 65 to 70, dribble manager unit 151, as described below, transfers data words 1 to 6 which were in registers 0 to 5 to stack 400. Similarly, as data words 70 to 65 are read out of stack cache memory circuit 610, data words 1 to 6 can be retrieved from stack 400 and placed in memory locations 0 to 5.

Since most reads and writes on a stack are from the top of the stack, a pointer OPTOP contains the location of the top of stack 400, i.e. the top memory location. In some embodiments of stack management unit 150, pointer OPTOP is a programmable register in execution unit 140. However other embodiments of stack management unit 150 maintain pointer OPTOP in stack control unit 152. Since pointer OPTOP is often increased by one, decreased by one, or changed by a specific amount, pointer OPTOP, in one embodiment is a programmable up/down counter.

Since stack management unit 150 contains the top portion of stack 400, pointer OPTOP indicates the register of stack cache memory circuit 610 containing the most recently written data word in stack cache memory circuit 610, i.e. pointer OPTOP points to the register containing the most recently written data word also called the top register. Some embodiments of stack management unit 150 also contains a pointer OPTOP1 (not shown) which points to the register preceding the register pointed to by pointer OPTOP. Pointer OPTOP1 can improve the performance of stack management unit 150 since many operations in hardware processor 100 require two data words from stack management unit 150.

Pointer OPTOP and pointer OPTOP1 are incremented whenever a new data word is written to stack cache 155. Pointer OPTOP and pointer OPTOP1 are decremented whenever a stacked data word, i.e., a data word already in stack 400, is popped off stack cache 155. Since some embodiments of hardware processor 100 may add or remove multiple data words simultaneously, pointers OPTOP and OPTOP1 are implemented, in one embodiment, as programmable registers so that new values can be written into the registers rather than requiring multiple increment or decrement cycles.

If stack cache 155 is organized using sequential addressing, pointer OPTOP1 may also be implemented using a modulo SCS subtractor, which modulo-SCS subtracts one from pointer OPTOP. Some embodiments of stack cache 155 may also include pointer OPTOP2 or pointer OPTOP3.

Since data words are stored in stack cache memory circuit 610 circularly, the bottom of stack cache memory circuit 610 can fluctuate. Therefore, most embodiments of stack cache memory circuit 610 include a pointer CACHE_BOTTOM to indicate the bottom memory location of stack cache memory circuit 610. Pointer CACHE_BOTTOM is typically maintained by dribble manager unit 151. The process to increment or decrement pointer CACHE_BOTTOM varies with the specific embodiment of stack management unit 150. Pointer CACHE_BOTTOM is typically implemented as a programmable up/down counter.

Some embodiments of stack management unit 150 also includes other pointers, such as pointer VARS, which points to a memory location of a data word that is often accessed. For example, if hardware processor 100 is implementing the JAVA Virtual Machine, entire method frames may be placed in stack management unit 150. The method frames often contain local variables that are accessed frequently. Therefore, having pointer VARS pointed to the first local variable of the active method decreases the access time necessary to read the local variable. Other pointers such as a pointer VARS1 (not shown) and a pointer VARS2 (not shown) may point to other often used memory locations such as the next two local variables of the active method in a JAVA Virtual Machine. In some embodiments of stack management unit 150, these pointers are maintained in stack control unit 152. In embodiments adapted for use with hardware processor 100, pointer VARS is stored in a programmable register in execution unit 140. If stack cache 155 is organized using sequential addressing, pointer VARS1 may also be implemented using a modulo-SCS adder which modulo-SCS adds one to pointer VARS.

Figure 8:
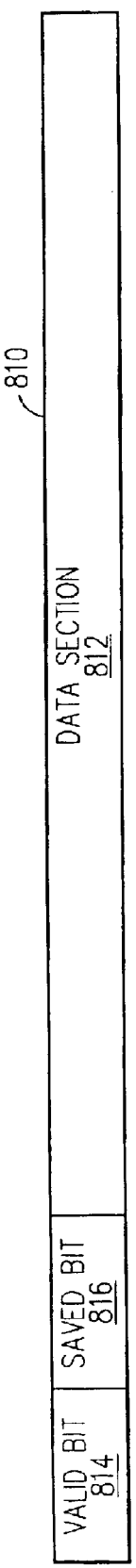
FIG. 8 illustrates the contents of a register or memory location of one embodiment of a stack cache in accordance with this invention.

To determine which data words to transfer between stack cache memory circuit 610 and stack 400, stack management unit 150, typically tags, i.e. tracks, the valid data words and the data words which are stored in both stack cache memory circuit 610 and stack 400. FIG. 8 illustrates one tagging scheme used in some embodiments of stack management unit 150.

Specifically, FIG. 8 shows a register 810 from stack cache memory circuit 610. The actual data word is stored in data section 812. A valid bit 814 and a saved bit 816 are used to track the status of register 810. If valid bit 814 is at a valid logic state, typically logic high, data section 812 contains a valid data word. If valid bit 814 is at an invalid logic state, typically logic low, data section 812 does not contain a valid data word. If saved bit 816 is at a saved logic state, typically logic high, the data word contained in data section 812 is also stored in stack 400. However, if saved bit 816 is at an unsaved logic state, typically logic low, the data word contained in data section 812 is not stored in stack 400. Typically, when stack management unit 150 is powered up or reset, valid bit 814 of each register is set to the invalid logic state and saved bit 816 of each register is set to the unsaved logic state.

For the embodiment illustrated in FIG. 6 using the tagging method of FIG. 8, when stack control unit 152 writes a data word to a register in stack cache memory circuit 610 through write port 630 the valid bit of that register is set to the valid logic state and the saved bit of that register is set to the unsaved logic state. When dribble manager unit 151 transfers a data word to a register of stack cache memory circuit 610 through write port 670, the valid bit of that register is set to the valid logic state and the saved bit of that register is set to the saved logic state since the data word is currently saved in stack 400.

When hardware processor 100 reads a stacked data word using a stack popping operation from a register of stack cache memory circuit 610 through either read port 640 or read port 650 the valid bit of that register is set to the invalid logic state and the saved bit of that location is set to the unsaved logic state. Typically, stack popping operations use the register indicated by pointer OPTOP or pointer OPTOP1.

When hardware processor 100 reads a data word with a non-stack popping operation from a register of stack cache memory circuit 610 through either read port 640 or read port 650 the valid bit and saved bit of the register are not changed. For example, if hardware processor 100 is implementing the JAVA Virtual Machine, a local variable stored in stack cache memory circuit 610 in the register indicated by pointer VARS may be used repeatedly and should not be removed from stack cache 155. When dribble manager unit 151 copies a data word from a register of stack cache memory circuit 610 to stack 400 through read port 680, the valid bit of that register remains in the valid logic state since the saved data word is still contained in that register and the saved bit of that register is set to the saved logic state.

Since stack cache 155 is generally much smaller than the memory address space of hardware processor 100, the pointers used to access stack cache memory circuit 610 are generally much smaller than general memory addresses. The specific technique used to map stack cache 155 into the memory space of hardware processor 100 can vary. In one embodiment of hardware processor 100 the pointers used to access stack cache memory circuit 610 are only the lower bits of general memory pointers, i.e. the least significant bits. For example, if stack cache memory circuit 610 comprises 64 registers, pointers OPTOP, VARS, and CACHE_BOTTOM need only be six bits long. If hardware processor 100 has a 12 bit address space, pointers OPTOP, VARS, and CACHE_BOTTOM could be the lower six bits of a general memory pointer. Thus stack cache memory circuit 610 is mapped to a specific segment of the address space having a unique upper six bit combination.

Some embodiments of stack cache management unit 150 may be used with a purely stacked based computing system so that there is not a memory address space for the system. In this situation, the pointers for accessing stack cache 155 are only internal to stack cache management unit 150.

As explained above, hardware processor 100 primarily accesses data near the top of the stack. Therefore, stack management unit 150 can improve data accesses of hardware processor 100 while only caching the top portion of stack 400. When hardware processor 100 pushes more data words to stack management unit 150 than stack cache memory circuit 610 is able to store, the data words near the bottom of stack cache memory circuit 610 are transferred to stack 400. When hardware processor 100 pops data words out of stack cache 155, data words from stack 400 are copied under the bottom of stack cache memory circuit 610, and pointer CACHE_BOTTOM is decremented to point to the new bottom of stack cache memory circuit 610.

Determination of when to transfer data words between stack 400 and stack cache memory circuit 610 as well as how many data words to transfer can vary. In general, dribble manager unit 151 should transfer data from stack cache memory circuit 610 to stack 400, i.e., a spill operation, as hardware processor 100 fills stack cache memory circuit 610. Conversely, dribble manager unit 151 should copy data from stack 400 to stack cache memory circuit 610, i.e., a fill operation, as hardware processor 100 empties stack cache memory circuit 610.

Figure 9:
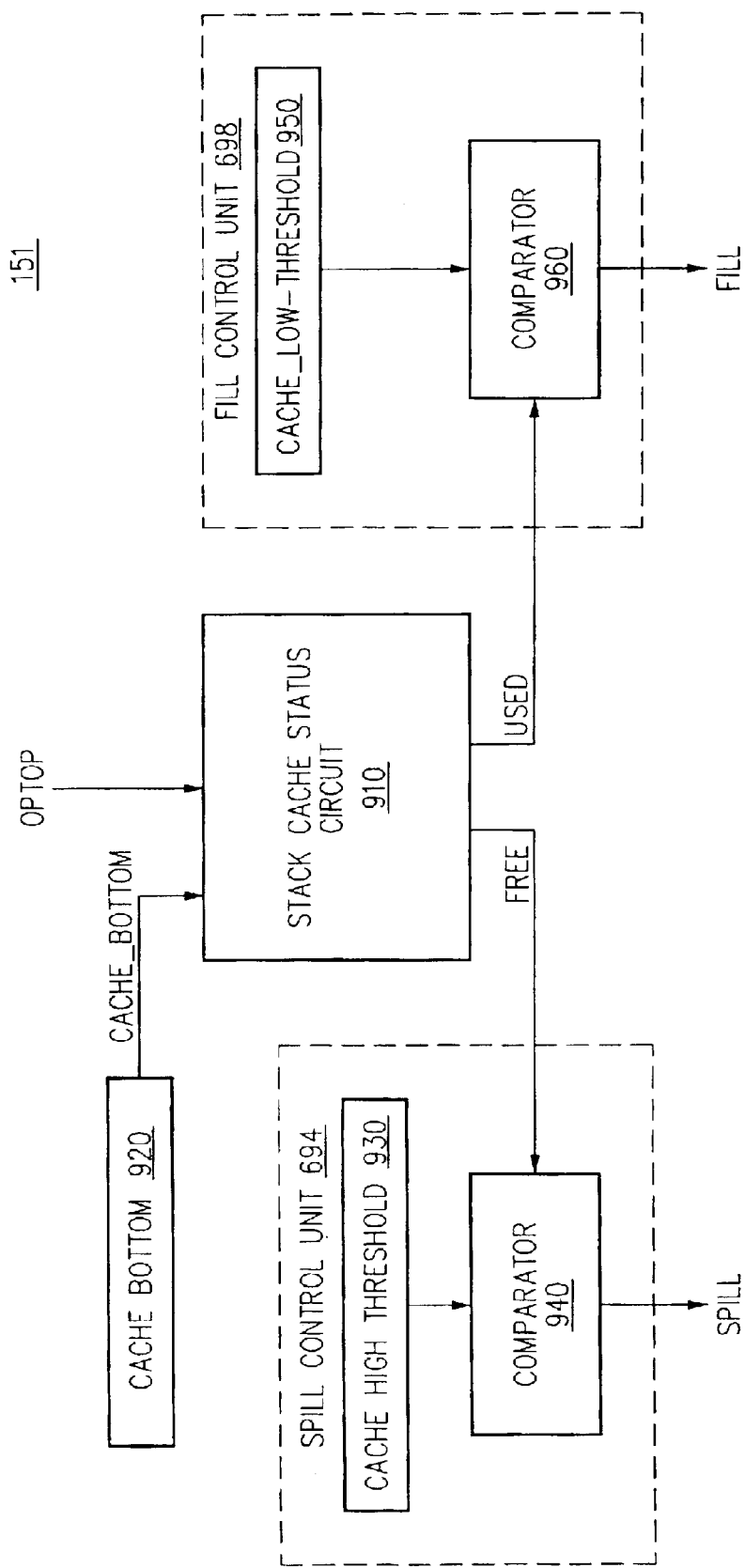
FIG. 9 illustrates a block diagram of one embodiment of a dribble manager unit in accordance with this invention.

FIG. 9 shows one embodiment of dribble manager unit 151 in which decisions on transferring data from stack cache memory circuit 610 to stack 400, i.e., spilling data, are based on the number of free registers in stack cache memory circuit 610. Free registers includes registers without valid data as well as registers containing data already stored in stack 400, i.e., registers with saved bit 816 set to the saved logic state. Decisions on transferring data from stack 400 to stack cache memory circuit 610, i.e., filling data, are based on the number of used registers. A used register contains a valid but unsaved data word in stack cache memory circuit 610.

Specifically in the embodiment of FIG. 9, dribble manager unit 151 further includes a stack cache status circuit 910 and a cache bottom register 920, which can be a programmable up/down counter. Stack cache status circuit 910, receives pointer CACHE_BOTTOM from cache bottom register 920 and pointer OPTOP to determine the number of free registers FREE and the number of used registers USED.

For a circular buffer using sequential modulo-SCS addressing, as in FIG. 7, the number of free registers FREE is defined as

FREE=SCS−(OPTOP−CACHE_BOTTOM+1) MOD SCS, where SCS is the size of stack cache 155. Thus, for the specific pointer values shown in FIG. 7, the number of free registers FREE is 34, as calculated by:

FREE=64−((27−62+1) MOD 64)=34.

Similarly, for a circular buffer using sequential modulo addressing, the number of used registers USED is defined as

USED=(OPTOP−CACHE_BOTTOM+1) MOD SCS.

Thus, for the specific pointer values shown in FIG. 7, the number of used registers USED is 30, as calculated by:

USED=(27−62+1) MOD 64.

Thus, stack cache status circuit 910 can be implemented with a modulo SCS adder/subtractor. The number of used registers USED and the number of free registers FREE can also be generated using a programmable up/down counters. For example, a used register can be incremented whenever a data word is added to stack cache 155 and decremented whenever a data word is removed from stack cache 155. Specifically, if pointer OPTOP is modulo-SCS incremented by some amount, the used register is incremented by the same amount. If pointer OPTOP is modulo-SCS decremented by some amount, the used register is decremented by the same amount. However, if pointer CACHE_BOTTOM is modulo-SCS incremented by some amount, the used register is decremented by the same amount. If pointer CACHE_BOTTOM is modulo-SCS decremented by some amount, the used register is incremented the same amount. The number of free registers FREE can be generated by subtracting the number of used registers USED from the total number of registers.

Spill control unit 694 (FIGS. 6 and 9) includes a cache high threshold register 930 and a comparator 940. Comparator 940 compares the value in cache high threshold register 930 to the number of free registers FREE. If the number of free registers FREE is less than the value in cache high threshold register 930, comparator 940 drives a spill signal SPILL to a spill logic level, typically logic high, to indicate that the spill condition exists and one or more data words should be transferred from stack cache memory circuit 610 to stack 400, i.e. a spill operation should be performed. The spill operation is described in more detail below. Typically, cache high threshold register 930 is programmable by hardware processor 100.

Fill control unit 698 (FIGS. 6 and 9) includes a cache low threshold register 950 and a comparator 960. Comparator 960 compares the value in cache low threshold register 950 to the number of used registers USED. If the number of used registers is less than the value in cache low threshold register 950, comparator 960 drives a fill signal FILL to a fill logic level, typically logic high, to indicate that the fill condition exists and one or more data words should be transferred from stack 400 to stack cache memory circuit 610, i.e. a fill operation should be performed. The fill operation is described in more detail below. Typically, cache low threshold register 950 is programmable by hardware processor 100.

If the value in cache high threshold 930 and cache low threshold 940 is always the same, a single cache threshold register can be used. Fill control unit 698 can be modified to use the number of free registers FREE to drive signal FILL to the fill logic level if the number of free registers is greater than the value in cache low threshold 950, with a proper modification of the value in cache low threshold 950. Alternatively, spill control unit 694 can be modified to use the number of used registers.

Figure 10A:
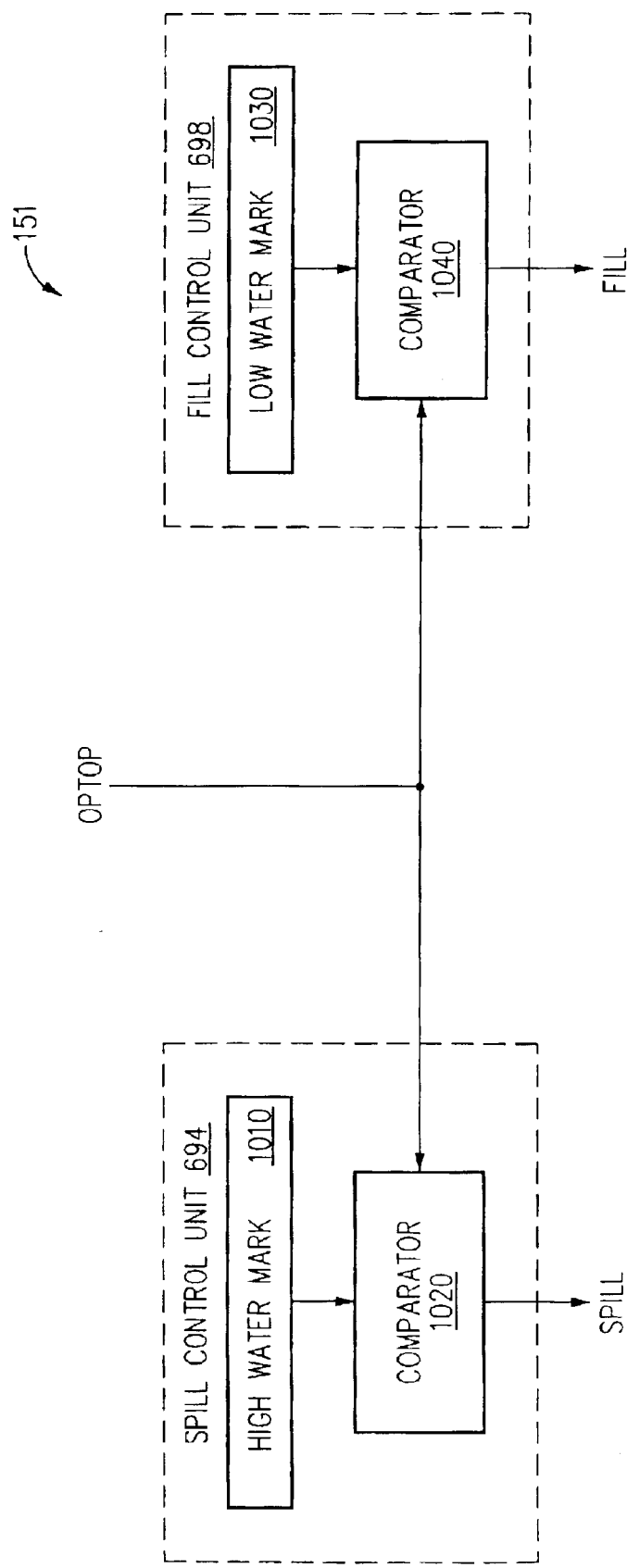
FIG. 10A illustrates a block diagram of another embodiment of a dribble manager unit in accordance with this invention.

FIG. 10A shows another embodiment of dribble manager unit 151, which uses a high-water mark/low-water mark heuristic to determine when a spill condition or a fill condition exists. Spill control unit 694 includes a high water mark register 1010 implemented as a programmable up/down counter. A comparator 1020 in spill control unit 694 compares the value in high water mark register 1010, i.e. the high water mark, with pointer OPTOP. If pointer OPTOP is greater than the high water mark, comparator 1020 drives spill signal SPILL to the spill logic level to indicate a spill operation should be performed. Since, the high water mark is relative to pointer CACHE_BOTTOM, the high water mark is modulo-SCS incremented and modulo-SCS decremented whenever pointer CACHE_BOTTOM is modulo-SCS incremented or modulo-SCS decremented, respectively.

Fill control unit 698 includes a low water mark register 1010 implemented as a programmable up/down counter. A comparator 1030 in fill control unit 698 compares the value in low water mark register 1030, i.e. the low water mark, with pointer OPTOP. If pointer OPTOP is less than the low water mark, comparator 1040 drives fill signal FILL to the fill logic level to indicate a fill operation should be performed. Since the low water mark is relative to pointer CACHE_BOTTOM, the low water mark register is modulo-SCS incremented and modulo-SCS decremented whenever pointer CACHE_BOTTOM is modulo-SCS incremented or modulo-SCS decremented, respectively.

Figure 10B:
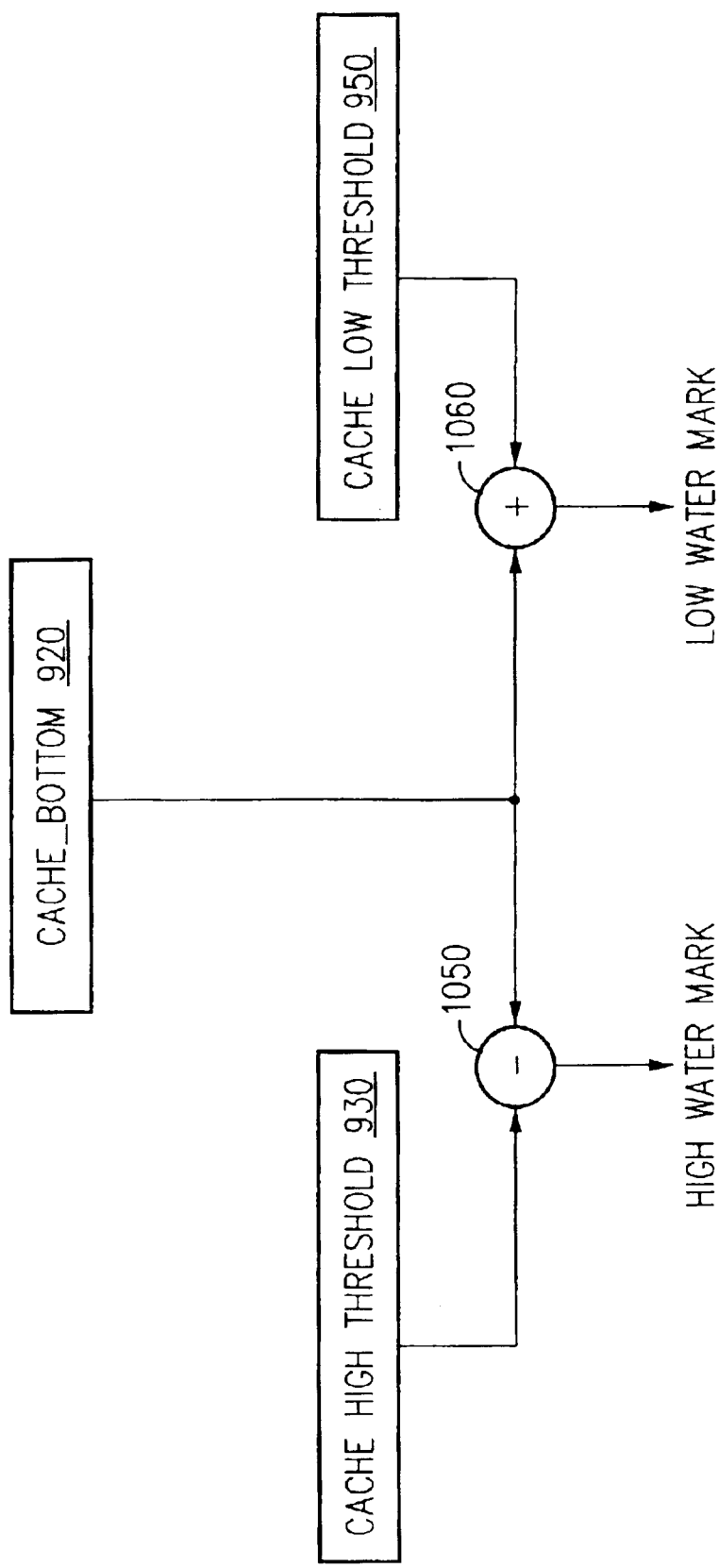
FIG. 10B illustrates a block diagram of another embodiment of a dribble manager unit in accordance with this invention.

FIG. 10B shows an alternative circuit to generate the high water mark and low water mark. Cache high threshold register 930, typically implemented as a programmable register, contains the number of free registers which should be maintained in stack cache memory circuit 610. The high water mark is then calculated by modulo-SCS subtractor 1050 by modulo-SCS subtracting the value in cache high threshold register 930 from pointer CACHE_BOTTOM stored in cache bottom register 920.

The low water mark is calculated by doing a modulo-SCS addition. Specifically, cache low threshold register 950 is programmed to contain the minimum number of used data registers desired to be maintained in stack cache memory circuit 610. The low water mark is then calculated by modulo-SCS adder 1060 by modulo-SCS adding the value in cache low threshold register 950 with pointer CACHE_BOTTOM stored in cache bottom register 920.

As described above, a spill operation is the transfer of one or more data words from stack cache memory circuit 610 to stack 400. In the embodiment of FIG. 1, the transfers occurs though data cache unit 160. The specific interface between stack management unit 150 and data cache unit 160 can vary. Typically, stack management unit 150, and more specifically dribble manager unit 151, sends the data word located at the bottom of stack cache 155, as indicated by pointer CACHE_BOTTOM from read port 680 to data cache unit 160. The value of pointer CACHE_BOTTOM is also provided to data cache unit 160 so that data cache unit 160 can address the data word appropriately. The saved bit of the register indicated by pointer CACHE_BOTTOM is set to the saved logic level. In addition, pointer CACHE_BOTTOM is modulo-SCS incremented by one. Other registers as described above may also be modulo-SCS incremented by one. For example, high water mark register 1010 (FIG. 10A) and low water mark 1030 would be modulo-SCS incremented by one. Some embodiments of dribble manager unit 151 transfer multiple words for each spill operation. For these embodiments, pointer CACHE_BOTTOM is modulo-SCS incremented by the number words transferred to stack 400.

In embodiments using a saved bit and valid bit, as shown in FIG. 8, some optimization is possible. Specifically, if the saved bit of the data register pointed to by pointer CACHE_BOTTOM is at the saved logic level, the data word in that data register is already stored in stack 400. Therefore, the data word in that data register does not need to be copied to stack 400. However, pointer CACHE_BOTTOM is still modulo-SCS incremented by one.

A fill operation transfers data words from stack 400 to stack cache memory circuit 610. In the embodiment of FIG. 1, the transfers occurs though data cache unit 160. The specific interface between stack management unit 150 and data cache unit 160 can vary. Typically, stack management unit 150, and more specifically dribble manager unit 151, determines whether the data register preceding the data register pointed by CACHE_BOTTOM is free, i.e. either the saved bit is in the saved logic state or the valid bit is in the invalid logic state. If the data register preceding the data register pointed to by pointer CACHE_BOTTOM is free, dribble manager unit 151 requests a data word from stack 400 by sending a request with the value of pointer CACHE_BOTTOM modulo-SCS minus one. When the data word is received from data cache unit 160, pointer CACHE_BOTTOM is modulo-SCS decremented by one and the received data word is written to the data register pointed to by pointer CACHE_BOTTOM through write port 670. Other registers as described above may also be modulo-SCS decremented. The saved bit and valid bit of the register pointed to by pointer CACHE_BOTTOM are set to the saved logic state and valid logic state, respectively. Some embodiments of dribble manager unit 151 transfer multiple words for each spill operation. For these embodiments, pointer CACHE_BOTTOM is modulo-SCS decremented by the number words transferred to stack 400.

In embodiments using a saved bit and valid bit, as shown in FIG. 8, some optimization is possible. Specifically, if the saved bit and valid bit of the data register preceding the data register pointed to by pointer CACHE_BOTTOM is at the saved logic level and the valid logic level, respectively, then the data word in that data register was never overwritten. Therefore, the data word in that data register-does not need to be copied from stack 400. However, pointer CACHE_BOTTOM is still modulo-SCS decremented by one.

Figure 11:
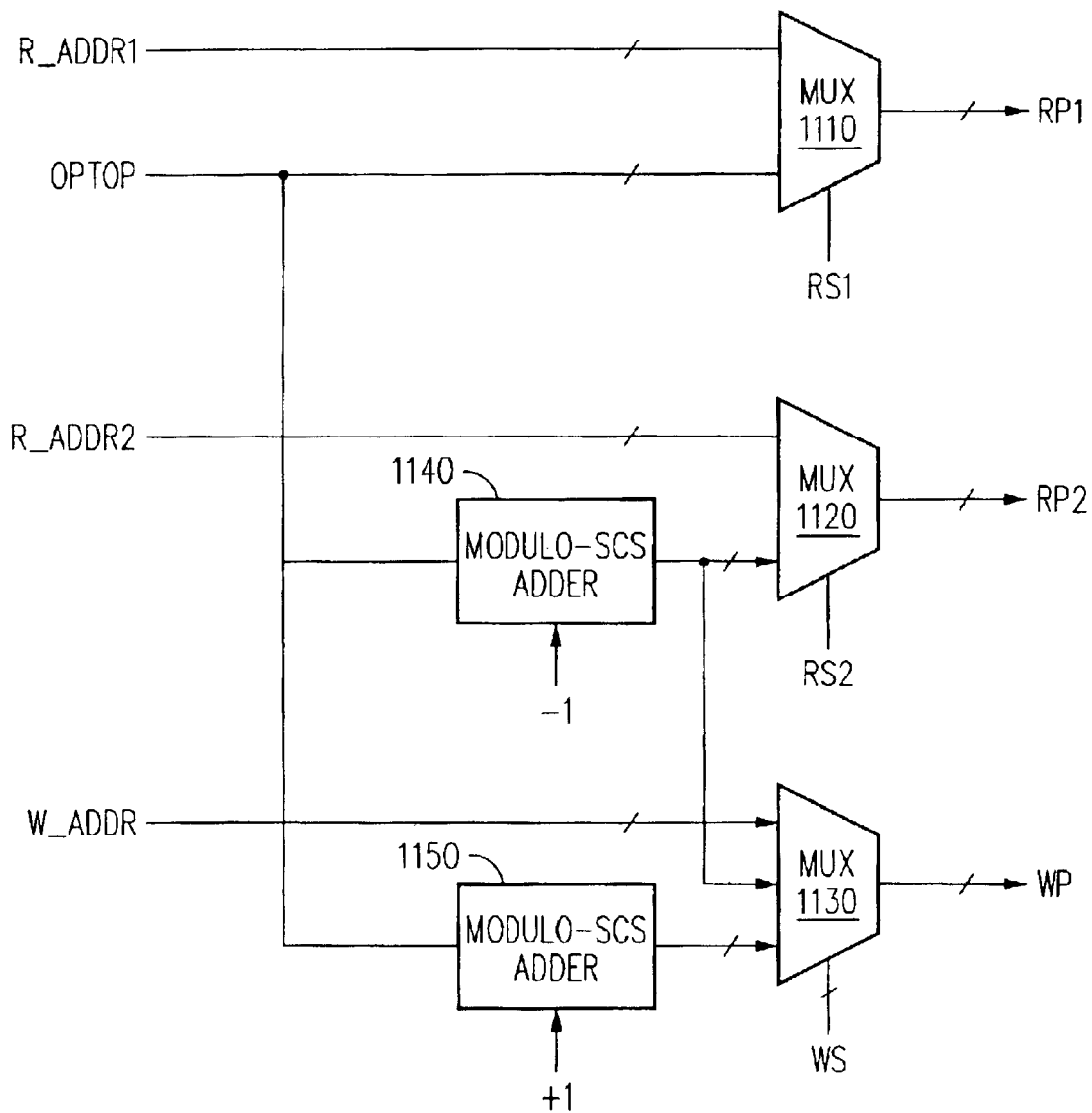
FIG. 11 illustrates a block diagram of a portion of an embodiment of a dribble manager unit in accordance with this invention.

As stated above, in one embodiment of stack cache 155, hardware processor 100 accesses stack cache memory circuit 610 (FIG. 6) through write port 630, read port 640 and read port 650. Stack control unit 152 generates pointers for write port 630, read port 640, and read port 650 based on the requests of hardware processor 100. FIG. 11 shows a circuit to generate pointers for a typical operation, which reads two data words from stack cache 155 and writes one data word to stack cache 155. The most common stack manipulation for a stack-based computing system is to pop the top two data words off the stack and to push a data word onto the top of the stack. Therefore, the circuit of FIG. 11 is configured to be able to provide read pointers to the value of pointer OPTOP and the value of pointer OPTOP modulo-SCS minus one, and a write pointer to the current value of OPTOP modulo-SCS minus one.

Multiplexer (MUX) 1110 drives a read pointer RP1 for read port 640. A select line RS1 controlled by hardware processor 100 determines whether multiplexer 1110 drives the same value as pointer OPTOP or a read address R_ADDR1 as provided by hardware processor 100.

Multiplexer 1120 provides a read pointer RP2 for read port 650. Modulo adder 1140 modulo-SCS adds negative one to the value of pointer OPTOP and drives the resulting sum to multiplexer 1120. A select line RS2 controlled by hardware processor 100 determines whether multiplexer 1120 drives the value from modulo adder 1140 or a read address R_ADDR2 as provided by hardware processor 100.

Multiplexer 1130 provides a write pointer WP for write port 630. A modulo adder 1150 modulo-SCS adds one to the value of pointer OPTOP and drives the resulting sum to multiplexer 1130. Select lines WS controlled by hardware processor 100 determines whether multiplexer 1130 drives the value from modulo-SCS adder 1140, the value from modulo-SCS adder 1150, or a write address W_ADDR as provided by hardware processor 100.

Figure 12:
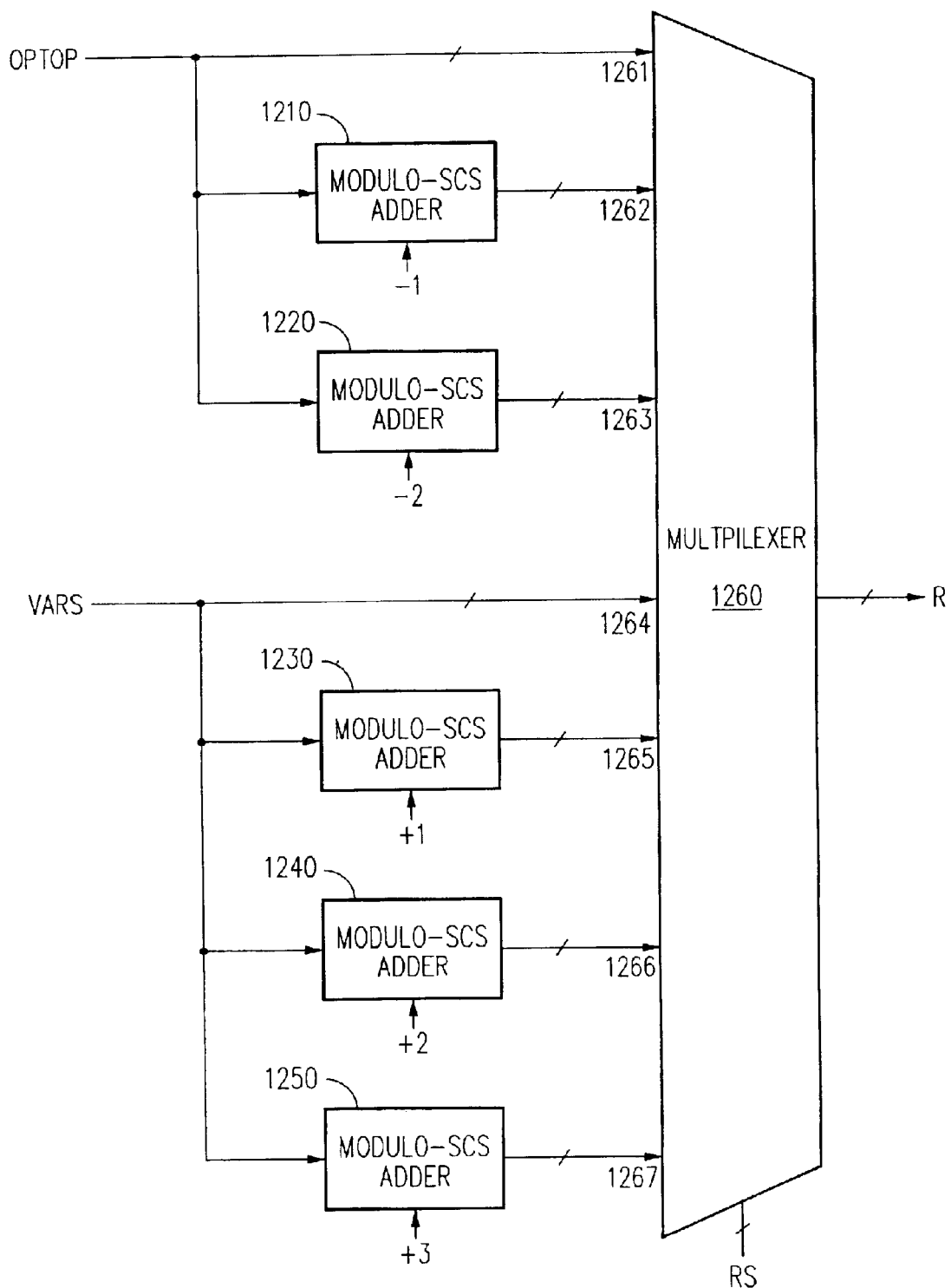
FIG. 12 illustrates a pointer generation circuit for one embodiment of a stack cache in accordance with this invention.

FIG. 12 shows a circuit that generates a read pointer R for read port 640 or read port 650 in embodiments allowing accessing stack cache memory circuit using pointer VARS. Multiplexer 1260 drives read pointer R to one of several input values received on input ports 1261–1267 as determined by selection signals RS. Selection signals RS are controlled by hardware processor 100. The value of pointer OPTOP is driven to input port 1261. Modulo-SCS adder 1210 drives the modulo-SCS sum of the value of pointer OPTOP with negative one to input port 1262. Modulo-SCS adder 1210 drives the modulo-SCS sum of the value of pointer OPTOP with negative two to input port 1263. The value of pointer VARS is driven to input port 1264. Modulo-SCS adder 1230 drives the modulo-SCS sum of the value of pointer VARS with one to input port 1265. Modulo-SCS adder 1240 drives the modulo-SCS sum of the value of pointer VARS with two to input port 1266. Modulo adder-SCS 1250 drives the modulo-SCS sum of the value of pointer VARS with three to input port 1263. Other embodiments may provide other values to the input ports of multiplexer 1260.

Thus by using the stack cache according to the principles of the invention, a dribbling management unit can efficiently control transfers between the stack cache and the stack. Specifically, the dribbling management unit is able to transfer data out of the stack cache to make room for additional data as necessary and transfer data into the stack cache as room becomes available transparently to the stack-based computing system using the stack management unit.

The various embodiments of the structure and method of this invention that are described above are illustrative only of the principles of this invention and are not intended to limit the scope of the invention to the particular embodiments described. In view of this disclosure, those skilled-in-the-art can define other memory circuits, registers, counters, stack-based computing systems, dribble management units, fill control units, spill control units, read ports, write ports, and use these alternative features to create a method or system of stack caching according to the principles of this invention.

We claim:

1. A method of storing a method frame of a method call in a computing system comprising:

storing an execution environment of said method frame in a first memory circuit; and storing one or more parameters, on or more variables, and one or more operands of said method frame in a second memory circuit,
wherein said one or more parameters and said one or more variables form a local variable area of said method frame; and
said second memory circuit is a stack.

2. The method of claim 1, wherein said execution environment comprises a return program counter.

3. The method of claim 1, wherein said execution environment comprises a return frame.

4. The method of claim 1, wherein said execution environment comprises a return constant pool.

5. The method of claim 1, wherein said execution environment comprises a current method vector.

6. The method of claim 1, wherein said execution environment comprises a current monitor address.

7. The method of claim 1, wherein said one or more operands form an operand stack of said method frame.

8. The method of claim 1, further comprising removing said execution environment from said first memory circuit upon completion of said method call.

9. The method of claim 1, wherein said first memory circuit is a stack.

10. The method of claim 9, wherein said stack is cached by a stack cache comprising:
a stack cache having a plurality of memory locations;
a frame pointer pointed at a top memory location of said stack cache; and
a bottom pointer pointed at a bottom memory location of said stack cache.

11. The method of claim 10, further comprising:
writing a new execution environment on said stack at said top memory location;
incrementing said frame pointer;
spilling a first execution environment from said stack cache to said stack if a spill condition exists; and
filling a second execution environment from said stack to said stack cache if a fill condition exists.

12. The method of claim 11, wherein said spilling a first execution environment from said stack cache to said stack comprises:
transferring said first execution environment from said bottom memory location to said stack; and
incrementing said bottom pointer.

13. The method of claim 11, wherein said filling a second execution environment from said stack cache to said stack comprises:
decrementing said bottom pointer; and
transferring a second execution environment from said stack to said bottom memory location.

14. The method of claim 11, wherein said filling a second execution environment from said stack cache to said stack comprises:
transferring a second execution environment from said stack to a memory location preceding said bottom memory location; and
decrementing said bottom pointer.

15. The method of claim 11, further comprising:
reading a first stacked execution environment from said stack cache at said top memory location; and
decrementing said frame pointer.

16. The method of claim 11, further comprises determining if said spill condition exists.

17. The method of claim 16 wherein said determining if said spill condition exists comprises:
calculating a number of free memory locations; and
comparing said number of free memory locations to a high cache threshold.

18. The method of claim 16 wherein said determining if said spill condition exists comprises:
comparing an optop pointer to a high water mark.

19. The method of claim 11, further comprises determining if said fill condition exists.

20. The method of claim 19, wherein said determining if said fill condition exists comprises:
calculating a number of used memory locations; and
comparing said number of used memory locations to a low cache threshold.

21. The method of claim 19 wherein said determining if said fill condition exists comprises:
comparing an optop pointer to a low water mark.

22. The method of claim 1, wherein said stack is cached by a stack cache comprising:
a stack cache having a plurality a memory locations;
an optop pointer pointed at a top memory location of said stack cache; and
a bottom pointer pointed at a bottom memory location of said stack cache.

23. The method of claim 22, further comprising:
writing a new data word for said tack at said top memory location;
incrementing said optop pointer;
spilling a first data word from said stack cache to said stack if a spill condition exists; and
filling a second data word from said stack to said stack cache if a fill condition exists.

24. The method of claim 23, wherein said spilling a first data word from said stack ache to said stack comprises:
transferring said first data word from said bottom memory location to said stack; and
incrementing said bottom pointer.

25. The method of claim 23, wherein said filling a second data word from said stack cache to said stack comprises:
decrementing said bottom pointer; and
transferring a second data word from said stack to said bottom memory location.

26. The method of claim 23, wherein said filling a second data word from said stack cache to said stack comprises:
transferring a second data word from said stack to a memory location preceding said bottom memory location; and
decrementing said bottom pointer.

27. The method of claim 23, further comprising:
reading a stacked data word from said stack cache at said top memory location; and
decrementing said optop pointer.

28. The method of claim 23, further comprising:
reading a first stacked data word from said stack cache at said top memory location; and
reading a stacked data word from said stack cache at a memory location preceding said top memory location; and
decrementing said optop pointer by two.

29. A memory architecture of a computing system capable of executing a plurality of method calls, said memory architecture comprising:
- a first memory circuit configured to store an execution environment for each of said method calls, wherein said first memory circuit comprises:
  - a circular memory buffer having a plurality of memory locations;
  - a frame pointer pointing to top memory location in said circular memory buffer;
  - a bottom pointer pointing to a bottom memory location in said circular memory buffer;
  - a first read port coupled to said circular memory buffer; and
  - a first write port coupled t said circular memory buffer; and
- a second memory circuit configure to store parameters, variables, and operands of each of said methods, wherein said second memory circuit comprises:
  - a stack; and
  - a stack cache management unit for caching said stack.

30. The memory architecture of claim 29, wherein
said first read port is configured to read data from said top memory location; and
said first write port is configure to write data above said top memory location.

31. The memory architecture of claim 30, wherein said first read port is also configured to read data from said bottom memory location; and
said first write port is also configured to write data below said bottom memory location.

32. The memory architecture of claim 31, wherein said bottom pointer is decremented if said first write port writes data below said bottom memory location.

33. The memory architecture of claim 31, wherein said bottom pointer is incremented if said first read port reads data from said bottom memory location.

34. The memory architecture of claim 30, further comprising:
- a second read port coupled to said circular memory buffer; and
- a second write port coupled to said circular memory buffer.

35. The memory architecture of claim 34, wherein
said second read port is configure to read data from said bottom memory location; and
said second write port is configured to write data below said bottom memory location.

36. The memory architecture of claim 35, wherein said bottom pointer is decremented if said second write port writes data below said bottom memory location.

37. The memory architecture of claim 35, wherein said bottom pointer is incremented if said second read port reads data from said bottom memory location.

38. The memory architecture of claim 29, wherein said frame pointer is incremented if said first write port writes data above said top memory location.

39. The memory architecture of claim 29, wherein said frame pointer is decremented if said first read port pops data from said top memory location.

40. The memory architecture of claim 29, wherein said stack cache management unit comprises:
- a stack cache having a stack cache memory circuit coupled to said stack, said stack cache memory circuit having a plurality of memory locations;
- a cache bottom pointer pointing to and defining a bottom memory location within said stack cache memory circuit;
- a spill control unit coupled to transfer a first data word stored in said bottom memory location from said stack cache to said stack; and
- a fill control unit coupled to transfer a second data word from said stack to said bottom memory location or a memory location adjacent said bottom memory location.

41. The memory architecture of claim 40, wherein said stack cache further comprises:
- a first read port coupled between said stack cache memory circuit and said stack, wherein paid spill control unit controls said first read port; and
- a first write port coupled between said stack cache memory circuit and said stack, wherein said fill control unit controls said first write port.

42. The memory architecture of claim 41, further comprising an optop pointer pointing to and defining a top memory location of said stack cache memory circuit.

* * * * *

UNITED STATES PATENT AND TRADEMARK OFFICE
CERTIFICATE OF CORRECTION

PATENT NO. : 6,950,923 B2
DATED : September 27, 2005
INVENTOR(S) : James Michael O'Connor et al.

It is certified that error appears in the above-identified patent and that said Letters Patent is hereby corrected as shown below:

Title page,
Item [63], Related U.S. Application Data, replace "6,532,521" with -- 6,532,531 --.

Column 1,
Line 11, replace "6,532, 521" with -- 6,532,531 --.

Column 33,
Line 1, replace "on" with -- one --.

Column 34,
Lines 1 and 6, following "16", insert -- , --;
Line 16, following "19", insert -- , --;
Line 27, replace "tack" with -- stack --;
Line 35, replace "ache" with -- cache --.

Column 35,
Line 9, prior to "top" insert -- a --;
Line 15, replace "t" with -- to --;
Lines 17 and 25, replace "configure" with -- configured --.

Column 36,
Line 2, replace "configure" with -- configured --;
Line 36, replace "paid" with -- said --.

Signed and Sealed this

Fourteenth Day of February, 2006

JON W. DUDAS
*Director of the United States Patent and Trademark Office*